United States Patent
Han et al.

(10) Patent No.: US 11,822,032 B2
(45) Date of Patent: Nov. 21, 2023

(54) CASING WALL THICKNESS DETECTION FROM HIGHER ORDER SHEAR-HORIZONTAL MODE SIGNALS

(71) Applicant: Baker Hughes, Houston, TX (US)

(72) Inventors: Wei Han, Sugar Land, TX (US); Douglas J. Patterson, Magnolia, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 1237 days.

(21) Appl. No.: 16/184,780

(22) Filed: Nov. 8, 2018

(65) Prior Publication Data

US 2020/0150304 A1 May 14, 2020

(51) Int. Cl.
- G01V 1/46 (2006.01)
- G01V 1/50 (2006.01)
- G01N 29/07 (2006.01)

(52) U.S. Cl.
CPC ............... *G01V 1/46* (2013.01); *G01N 29/07* (2013.01); *G01V 1/50* (2013.01); *G01N 2291/044* (2013.01); *G01N 2291/0422* (2013.01)

(58) Field of Classification Search
None
See application file for complete search history.

(56) References Cited

U.S. PATENT DOCUMENTS

| | | | |
|---|---|---|---|
| 5,214,614 A * | 5/1993 | Baule | G01V 1/16 |
| | | | 181/112 |
| 5,608,164 A | 3/1997 | MacLauchlan | |

(Continued)

FOREIGN PATENT DOCUMENTS

| | | | |
|---|---|---|---|
| CN | 10251940 | 6/2012 | |
| CN | 103026265 A * | 4/2013 | ............ G01V 1/003 |

(Continued)

OTHER PUBLICATIONS

Wang, Hua, Guo Tao, and Xuefeng Shang. "Understanding acoustic methods for cement bond logging." The Journal of the Acoustical Society of America 139.5 (2016): 2407-2416. (Year: 2016).*

(Continued)

*Primary Examiner* — Isam A Alsomiri
*Assistant Examiner* — Jonathan D Armstrong
(74) *Attorney, Agent, or Firm* — CANTOR COLBURN LLP

(57) ABSTRACT

Methods, systems, devices, and products for hydrocarbon tubular evaluation. Methods comprise conveying the logging tool in the tubular with a carrier; inducing with a transmitter a horizontal shear (SH) wave; identifying higher order SH mode signals received at a plurality of offset receivers responsive to a higher order SH mode engendered by the horizontal shear (SH) wave; estimating a dominant frequency for higher order SH mode from the higher order SH mode signals; estimating a group velocity for the higher order SH mode from the higher order SH mode signals; and estimating a tubular parameter using the dominant frequency and the group velocity. The tubular parameter may be at least tubular thickness. The method includes estimating the tubular parameter independent of the fundamental horizontal shear wave mode (SH0).

19 Claims, 33 Drawing Sheets

(56) References Cited

U.S. PATENT DOCUMENTS

| | | | |
|---|---|---|---|
| 6,353,577 B1 * | 3/2002 | Orban | G01V 1/201 367/43 |
| 6,712,141 B1 * | 3/2004 | Bussear | E21B 47/01 181/102 |
| 6,868,356 B2 * | 3/2005 | Nai | G01B 21/045 33/502 |
| 7,392,137 B2 * | 6/2008 | Tabarovsky | G01V 3/28 702/7 |
| 7,660,197 B2 | 2/2010 | Barolak | |
| 7,878,044 B2 | 2/2011 | Andle | |
| 7,938,008 B2 | 5/2011 | Owens et al. | |
| 8,061,206 B2 | 11/2011 | Bolshakov et al. | |
| 8,170,809 B2 | 5/2012 | Van et al. | |
| 8,174,265 B2 * | 5/2012 | Bittar | G01V 3/30 324/338 |
| 8,201,454 B2 | 6/2012 | Paige | |
| 8,322,221 B1 | 12/2012 | Sathish et al. | |
| RE43,960 E | 2/2013 | Barolak | |
| 9,273,545 B2 | 3/2016 | Bolshakov et al. | |
| 9,488,623 B2 | 11/2016 | Rose et al. | |
| 10,048,395 B2 * | 8/2018 | Goujon | G01V 1/162 |
| 10,711,598 B2 * | 7/2020 | Wu | G01V 3/12 |
| 2005/0034917 A1 * | 2/2005 | Mathiszik | G01V 1/44 181/108 |
| 2006/0175057 A1 * | 8/2006 | Mandal | E21B 47/01 166/254.2 |
| 2007/0056795 A1 * | 3/2007 | Cox | G01V 1/52 181/111 |
| 2010/0195439 A1 * | 8/2010 | Muyzert | G01V 1/36 367/56 |
| 2010/0302909 A1 * | 12/2010 | Muyzert | G01V 1/184 367/178 |
| 2012/0253680 A1 * | 10/2012 | Thompson | G01V 3/16 73/152.16 |
| 2012/0253683 A1 * | 10/2012 | Edme | G01V 1/303 702/18 |
| 2012/0279308 A1 | 11/2012 | Yan et al. | |
| 2014/0219053 A1 * | 8/2014 | Goujon | G01V 1/181 367/37 |
| 2014/0219055 A1 * | 8/2014 | Goujon | G01V 1/181 367/56 |
| 2016/0025875 A1 * | 1/2016 | Friedly | G01V 1/20 367/76 |
| 2016/0334523 A1 * | 11/2016 | Edme | G01V 1/166 |
| 2018/0100387 A1 | 4/2018 | Kouchmeshky et al. | |
| 2018/0164462 A1 * | 6/2018 | Matuszyk | G01V 1/50 |
| 2019/0145241 A1 * | 5/2019 | Yao | E21B 47/005 348/85 |
| 2019/0227037 A1 * | 7/2019 | Maxfield | G01N 29/043 |
| 2019/0376383 A1 * | 12/2019 | Wu | G01V 3/34 |

FOREIGN PATENT DOCUMENTS

| | | | | |
|---|---|---|---|---|
| EP | 0261825 A2 * | 3/1988 | | G01V 1/44 |
| GB | 2580267 A * | 7/2020 | | E21B 47/0005 |
| WO | WO-2004005850 A2 * | 1/2004 | | G01V 3/28 |
| WO | WO-2015026997 A1 * | 2/2015 | | G01P 13/00 |
| WO | WO-2019005018 A1 * | 1/2019 | | E21B 47/12 |

OTHER PUBLICATIONS

Luo, W., et al., "Guided Wave Thickness Measurement with EMATs", Insight, vol. 45, No. 11, Nov. 2003, 1-5.

Patterson, D., et al., "Utilization fo Electormagnetic Acoustic Transducers in Downhole Cement Evaluation", SPWLA, Jul. 2015, 1-26.

Patterson, Doug, et al., "Extending the Understanding of In-Situ Cement Properties", SPWLA, Jun. 2016, 1-21.

Mustafa, Vasile, et al., "EMAT Generation of Horizontally Polarized Guided Shear Waves for Ultrasonic Pipe Inspection", International Pipeline Conference vol. 1, ASME Jan. 1998, 327-334.

Nurmalia, Nobutomo, et al., "Detection of Shear Horizontal Guided Waves Propagating in Aluminum Plate with Thinning Region," Japanese Journal of Applied Physics, Jul. 2011, 1-5.

* cited by examiner

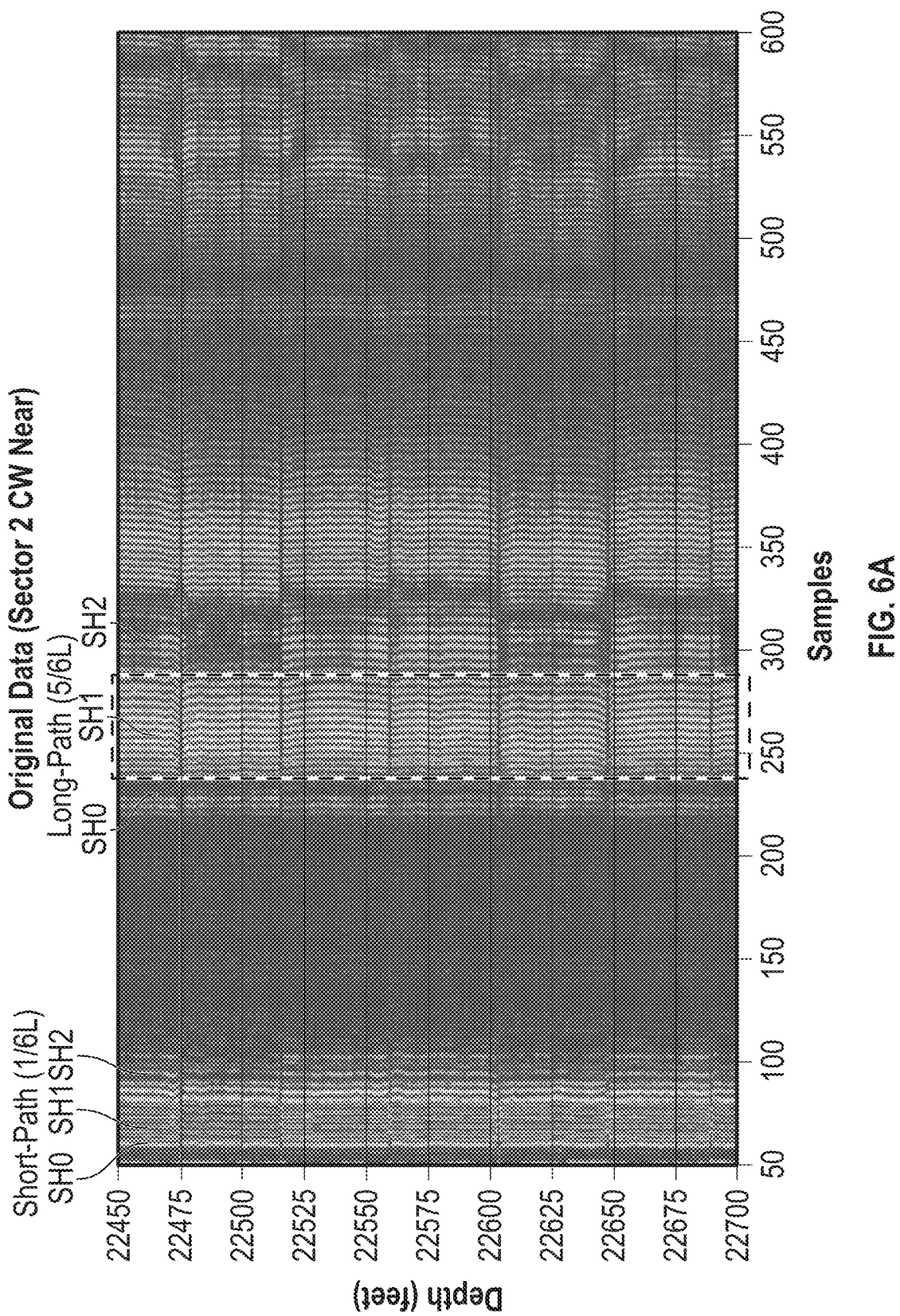

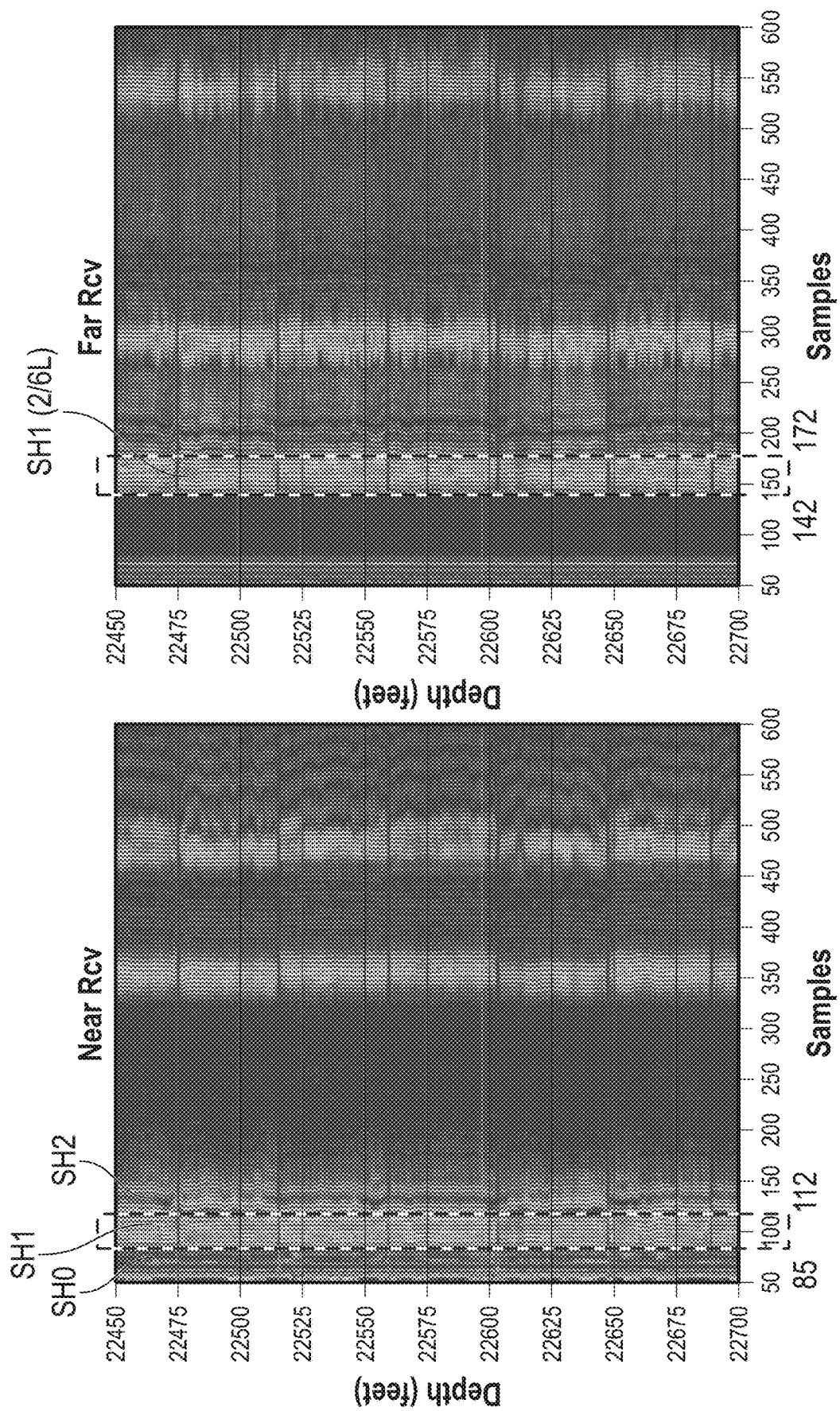

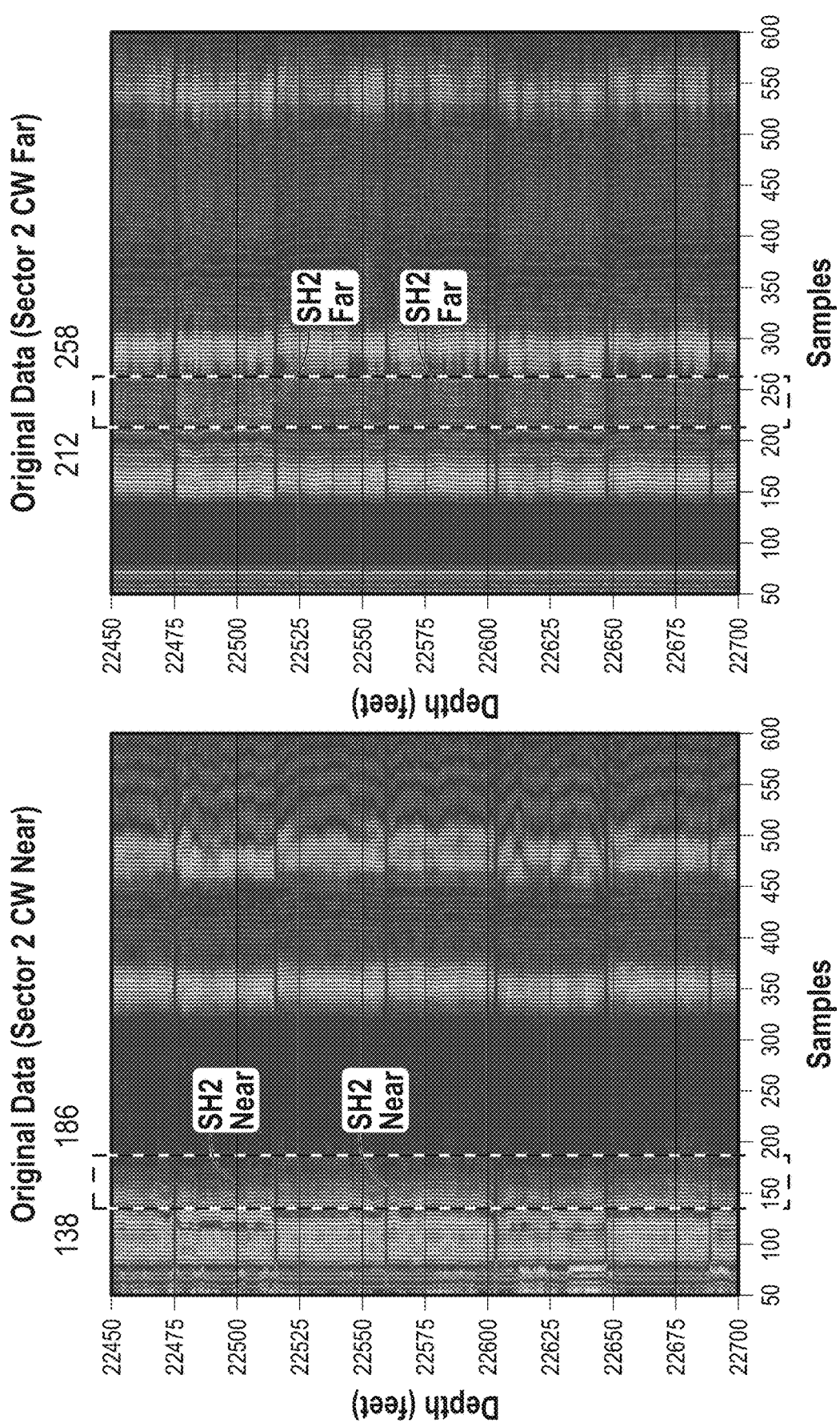

CASING WALL THICKNESS DETECTION FROM HIGHER ORDER SHEAR-HORIZONTAL MODE SIGNALS

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Development of the formation to extract hydrocarbons may include installation of tubing (also referred to as tubular members or tubulars), such as production tubing or steel pipe known as casing, within a borehole, including the application of cement in the annulus between borehole and casing. It is known to conduct acoustic inspection of a casing cemented in a borehole to determine specific properties related to the casing and surrounding materials.

For example, the bond between the cement and the casing may be evaluated, or the strength of the cement behind the casing or the casing thickness may be estimated, using measurements of reflected acoustic waves. This may be generally referred to as casing cement bond logging, which may be accomplished using a casing cement bond logging tool conveyed through the formation along the interior of the casing while taking measurements. In other examples of cement bond logging, a circumferential guided wave may be used to evaluate casing-related properties. For example, Lamb and shear wave attenuation measurements may be used to determine cement properties.

SUMMARY OF THE DISCLOSURE

In aspects, the present disclosure is related to methods and apparatuses for hydrocarbon tubular evaluation. Methods may include conveying the logging tool in the tubular with a carrier; inducing with a transmitter a horizontal shear (SH) wave; identifying higher order SH mode signals received at a plurality of offset receivers responsive to a higher order SH mode engendered by the horizontal shear (SH) wave; estimating a dominant frequency for higher order SH mode from the higher order SH mode signals; estimating a group velocity for the higher order SH mode from the higher order SH mode signals; and estimating a tubular parameter using the dominant frequency and the group velocity. Methods may include receiving the higher order SH mode signals at the plurality of azimuthally offset receivers.

The tubular parameter may be at least one of: i) location of the tubular; ii) thickness of a wall of the tubular; and iii) at least one property of a defect of the tubular; iv) a bond of the tubular with cement; v) outer diameter of the tubular; vi) a presence of a joint; and vii) a location of a joint. The at least one higher order horizontal shear wave mode may have a propagation that is substantially circumferential.

Estimating the tubular parameter may comprise estimating the tubular parameter independent of the fundamental horizontal shear wave mode (SH0). The tubular may comprise casing installed in the borehole using cement. Estimating the group velocity may be carried out by estimating a time delay between a first receiver of the plurality and a second receiver of the plurality, which may include employing a cross-correlation between a first portion of the higher order SH mode signals from the first receiver and a second portion of the higher order SH mode signals from the second receiver.

The plurality of receivers may include a first receiver located a first distance from the transmitter along a shortest circumferential path and a second receiver located a second distance from the transmitter along another shortest circumferential path, wherein the second distance is greater than the first distance. Estimating the dominant frequency may comprise performing a Fast Fourier Transform (FFT) of a portion of the higher order SH mode signals received at the second receiver to generate a FFT spectrum, and detecting a peak frequency of the FFT spectrum.

The tubular may comprise production tubing. Inducing an SH wave in the tubular may comprise exciting the SH wave with an electromagnetic acoustic transducer. Methods may include conducting further operations in the formation in dependence upon the tubular parameter. The further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) installing equipment in the borehole; x) producing one or more hydrocarbons from the formation; xi) repairing the tubular; xii) replacing the tubular. The tubular parameter may comprise a characteristic of a structural feature relating to the at least one tubular. The structural feature may comprise at least one of: i) tubular ovality of the at least one tubular; ii) deformation of the at least one tubular; iii) corrosion of the at least one tubular, iv) perforation of the at least one tubular, v) a material property of the at least one tubular; vi) a material property of a material surrounding the at least one tubular. The horizontal shear (SH) wave may propagate substantially circumferentially in the tubular. The plurality of offset receivers may be azimuthally offset and/or axially offset.

Aspects of the present disclosure include an apparatus for hydrocarbon tubular evaluation. The apparatus may include a logging tool having disposed thereon a plurality of transducers, the logging tool configured for conveyance in a tubular with a carrier; at least a first transducer pair of the plurality of transducers each configured to induce a horizontal shear (SH) wave; at least a second transducer pair of the plurality of transducers each configured to receive the induced horizontal shear (SH) waves; and at least one processor associated with the logging tool. The at least one processor may be configured to: identify higher order SH mode signals received at a plurality of offset receivers responsive to a higher order SH mode engendered by the horizontal shear (SH) wave; estimate a dominant frequency for higher order SH mode from the higher order SH mode signals; estimate a group velocity for the higher order SH mode from the higher order SH mode signals; and estimate a tubular parameter using the dominant frequency and the group velocity. Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 6A-6F show test results for the SH1 mode using short- and long-path signals in casing with 7-inch OD and 0.53 inches thickness in mostly free pipe.

FIG. 7A and FIG. 7B show well test results for SH1 mode using short-path signals in casing with 7-inch OD and 0.53 inches thickness in mostly free pipe.

FIGS. 8A & 8B show near- and far-receiver waveforms in accordance with embodiments of the present disclosure.

DETAILED DESCRIPTION

Figure 1A:
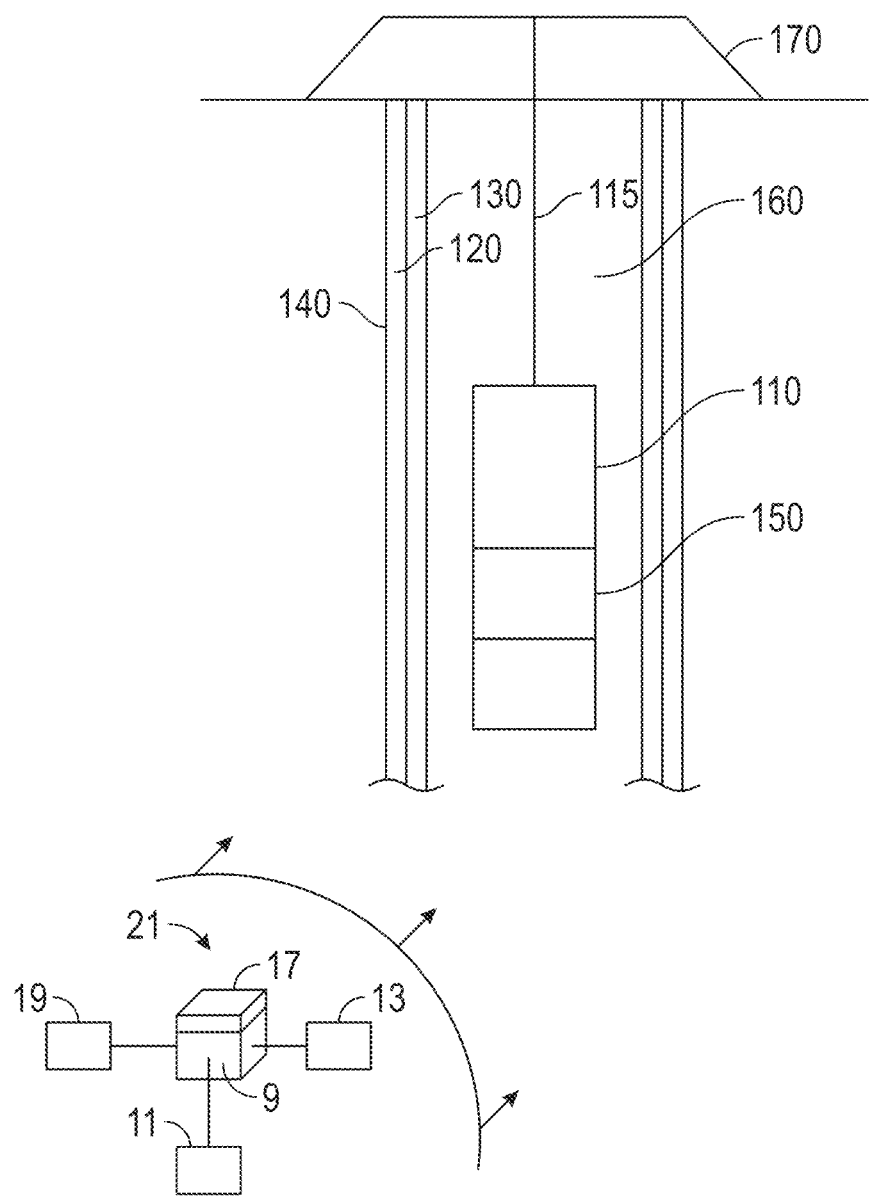
FIG. 1A illustrates an acoustic logging tool in accordance with embodiments of the present disclosure.

Aspects of the present disclosure relate to apparatus and methods for tubular evaluation, including, for example, evaluation of casing installed downhole and the cement bond resulting from the installation. Techniques described herein are particularly suited to casing integrity inspection.

Inspection of underground tubular is well known. Vast subterranean networks of installed tubular may suffer from defects at particular, but unpredictable, points. Detection of these defects are highly desirable. One prominent application is the detection of corrosion defects in downhole casing and tubing strings. Logging such strings is often the best (sometimes only) means of detecting these defects.

Aspects of the disclosure relate to a method for evaluating the thickness and the quality of casing in presence of surrounding cement. Casing evaluation may be carried out to estimate casing quality, i.e., wear and erosion from tool erosion, stress damage from mechanical and thermal loadings, and corrosion from chemicals (salt, sulfur, etc.) in borehole fluid over time. In the past, casing or other tubular damage has typically been monitored by evaluating thickness using various methods, e.g., acoustic tools (casing resonance, travel time), magnetic flux leakage tool, and eddy current devices.

Known EM corrosion-monitoring tools typically rely on the physical phenomena of flux leakage and/or electromagnetic induction. A flux leakage tool may magnetize the pipe to be inspected until substantially saturated. Near a point of defect (e.g., a pit, hole, or corroded area) on either the interior or exterior of the tubular, a portion of the magnetic flux leaks out of the tubular and is detected by coils on the tool's sensors. Since the magnet must be as close as possible to the tubular, tubing must be removed in order to inspect casing. Further, detection of slowly varying corrosion with a flux leakage tool may be problematic.

Conventional acoustic methods feature several advantages. Conventional techniques of casing thickness detection may include pulse-echo (time-of-flight), plane compressional half-wave resonance, constant (non-dispersive) wave velocity. While these techniques work well with fundamental mode (casing resonance), high-frequency harmonic resonances are subject to mud attenuation or decentralization which are problematic.

Ultrasonic acoustic tools provide better resolution due to their high directivity. Unfortunately, at ultrasonic frequencies, acoustic signals are impacted by weak signals from tool eccentricity, and by multiple coupled resonances from multiple liners. Embodiments may also excite an acoustic wave approximating the resonances of different casing and cement layers, which enhance wave penetration.

In recent years electromagnetic acoustic transducer (EMAT) sensor systems, based on well-understood physical phenomena, have been developed and increasingly deployed in cased well logging, both for casing-cement bond evaluation and for compressional and shear property characterization of the material behind casing. In one type of EMAT, when a wire is placed near the surface of an electrically conducting object and is driven by a current at a suitable ultrasonic frequency, eddy currents are induced in a near surface region of the object. If a static magnetic field is also present, these eddy currents experience Lorentz forces. These forces cause an acoustic excitation in the object. In a reciprocal use, an electric signal will be generated in the wire as a result of acoustic excitation in a metal placed close to a permanent magnet. Attenuation and/or reflection of the acoustic waves bear information on the defects and surroundings of the object. See, for example, U.S. patent application Ser. No. 15/288,092 to Kouchmeshky et al, which is commonly owned and incorporated by reference herein in its entirety.

Guided wave attenuation cement bond logging ('CBL') measures wave attenuation along a casing circumferential direction. Multiple transmitters and receivers may be placed inside the casing for compensated attenuation measurements. See, for example, U.S. Pat. No. 7,660,197 to Barolak et al. and U.S. Pat. No. RE43,960 to Barolak et al, incorporated by reference herein in their entirety. The mechanical properties (e.g., Young's modulus, shear modulus) of the cement layer behind the casing determine the attenuation of the waves. An EMAT may be designed to produce a single waveform, such as shear horizontal waves (SH) or Lamb waves.

The EMAT-based SH measurement has several distinct and more complicated features compared to the other methods mentioned above. First, SH waves propagating in casing typically involve multiple modes, including the fundamental shear wave mode (SH0 mode) (which is essentially the shear wave in the material) and the higher order modes; that is, modes greater than the fundamental mode (e.g., SH1, SH2, etc). Secondly, the SH0 and the higher order SH modes in cylindrical casing are dispersive. That is, the propagation group velocities of the modes are not constant and change with frequency. Due to the effects of wall thickness on each mode, the respective frequency of the first order and second order modes (SH1 and SH2, respectively) decrease with thickness, while each mode group velocity increases with thickness. Also important, characteristics of this propagation may be different for approximating a plate (plate model) and casing (cylindrical model).

Further, coupling and interference occur as a result of multiple mode presence and dispersion. The effects of SH wave propagation parameters (e.g., group velocity, frequency, attenuation, and so on) and casing size on SH responses have been modeled and interpreted using planar plate model and the more representative cylindrical casing models. Extensive theoretical models on the EMAT SH sensor responses, SH wave parameters, and the effects of casing size and cement properties on measurement are known. However, these approaches are not practically implementable for tubular thickness determination, particularly in the case of tubular having a wall thickness of more than 0.4 inches. For example, accurate estimation of the thickness necessitates a velocity measurement of the higher order mode of exceptionally high accuracy, which is technically challenging.

A method inducing a fundamental shear mode in combination with a higher order shear mode has been employed to estimate tubular thickness. See, for example, U.S. Pat. No. 8,061,206 to Bolshakov. The methods include measuring the SH0 mode group velocity, measuring the SH1 mode group velocity (Vg), assigning the measured SH0 mode group velocity as the tubular shear velocity (Vs), estimating a shear wave wavelength λ from the ratio of SH0 mode frequency (fo) and the measured SH0 group velocity, and estimating the tubular thickness (d) from the estimated shear wave wavelength λ.

The method and apparatus of the present disclosure provide for hydrocarbon tubular evaluation by inducing and measuring shear wave modes within a wellbore casing or other tubular. Aspects of the disclosure are particularly suited to facilitating analysis of wellbore casing in a cased hole—including the casing itself and cement and formation bonding. One or more electromagnetic acoustic transducers may be employed capable of producing and receiving various waveforms, including compressional waves, shear waves, Rayleigh waves, and Lamb waves.

Generally, method embodiments include conveying the logging tool in the tubular on a carrier and performing wave propagation evaluation with the logging tool. This evaluation may include estimating wave properties for at least one higher order horizontal shear wave mode in the tubular from measurement information generated at a plurality of sensors on the logging tool in response to the at least one higher order horizontal shear wave mode; and estimating a tubular parameter using the wave properties.

Specifically, the method is associated with generating, receiving, and analyzing shear horizontal waves (SH) propagated in the casing. More specifically, the SH waves may be generated and detected using an electromagnetic acoustic transducer (EMAT) device. A device consistent with or similar to U.S. patent application Ser. No. 15/288,092 to Kouchmeshky et al is one example of a suitable EMAT device. An EMAT device with at least two SH transducers and at least two SH receivers located azimuthally around the casing ID wall. The SH waves comprises of an SH0, and the higher order SH1 mode and SH2 mode etc. By selecting frequencies for a casing thickness, the SH waves with a dominant SH1 mode, or a dominant SH2 mode may be generated. Specifically, the method consists of inducing SH shear waves in the casing, detecting SH1 mode signals, calculating the frequency of the SH1 mode signal, and measuring the SH1 mode arrival group velocity, and estimating the casing wall thickness h from the measured SH1 group velocity $V_g$ and SH1 frequency f, using the relationship $$h=m\ V_g/(2f),$$

where m=~2, is the mode factor for SH1.

Alternatively, the above proposed method may be extended to use the SH2 mode signal, comprising of inducing SH shear waves in the casing, detecting SH2 mode signals, calculating the frequency f of the SH2 mode signal, and measuring the SH2 mode arrival group velocity, and estimating the casing wall thickness h using the relationship $$h=m\ V_g/(2f),$$

where the SH2 mode factor m=~3.

Aspects employ feed-back transmitter frequency control methods optimizing drive pulse frequency and improving thickness detection. These control methods may excite SH waves at the dominant SH1 (or SH2) mode frequency detected from a previous drive pulse center frequency, such as, for example, a frequency based on a nominal casing thickness. Alternatively, methods may first fire a wide-band short pulse, detect the dominant SH1 (and or SH2) mode in the casing, and then excite a narrow-band drive pulse at the frequency of the detected dominant SH1 (or SH2) mode. For a casing thickness within the range of 0.32-0.53 inches, m may be in a range of 2.0-2.25 for SH1 mode, and in a range of 3.0-3.3 for SH2 mode.

The SH-higher order techniques of the present disclosure have been extensively tested over a tubular thickness range of 0.318 inches to 0.53 inches. Improvement over SH plate models is particularly dramatic in thicker casing (e.g., 0.36 inches). Moreover, it does not require a priori knowledge of casing shear velocity or prior measurement of SH0 mode. In particular applications, it may be beneficial to employ method embodiments described herein in conjunction with plate model techniques to improve thin-casing thickness measurement for improved quality and consistency.

Aspects of the present disclosure relate to using at least one acoustic sensor as part of one or more downhole acoustic well logging tools or distributed sensor systems to produce acoustic information responsive to a propagating wave in the casing. The sensor may include at least one acoustic transmitter and at least one sensor disposed on a carrier in the borehole, and configured to implement techniques of the present disclosure, as described in further detail below. A receiver and transmitter may be implemented as the same transducer, different transducers, or one or more transducer arrays. Transducers may be selected from the group consisting of: (i) electro-magnetic acoustic transducers ('EMATs'), (ii) piezoelectric transducers, and (iii) wedge transducers. The information is indicative of a parameter of interest. The term "information" as used herein includes any form of information (analog, digital, EM, printed, etc.), and may include one or more of: raw data, processed data, and signals.

FIG. 1A illustrates an acoustic logging tool in accordance with embodiments of the present disclosure. The tool 110 is configured to be conveyed in a borehole intersecting a formation 180. The borehole wall 140 is lined with casing 130 filled with a downhole fluid 160, such as, for example, drilling fluid. Cement 120 fills the annulus between the borehole wall 140 and the casing 130. In one illustrative embodiment, the tool 110 may contain a sensor unit 150, comprising transmitters and receivers, which may include, for example, one or more EMATs as described above, including a magnet array and at least one sensor coil (or other acoustic transducers), and configured for evaluation of the cement bond existing between the system of the casing 130, the borehole wall 140, and the cement 120 according to known techniques. The transmitters and receivers may be azimuthally distributed about the circumference of the tool (e.g., six sensors with a 60-degree sensor spacing between nearest sensors). In some instances, the tool 110 comprises one or more pads extendable from the tool body. These pads may have the sensors of the sensor unit distributed among them. See, for example, U.S. patent application Ser. No. 15/288,092 to Kouchmeshky et al, which is commonly owned and incorporated by reference herein in its entirety. In other implementations, the sensor unit may be integrated into the body. Sensor unit 150 may include may include electronics configured to record and/or process the information obtained, or these electronics may be elsewhere on tool 110 or at the surface.

The system 101 may include a conventional derrick 170. A conveyance device (carrier 115) which may be rigid or non-rigid, may be configured to convey the downhole tool 110 into wellbore 140 in proximity to formation 180. The carrier 115 may be a wireline, coiled tubing, a slickline, an e-line, drill string, etc. Downhole tool 110 may be coupled or combined with additional tools. Thus, depending on the configuration, the tool 110 may be used during drilling and/or after the wellbore (borehole) 140 has been formed. While a land system is shown, the teachings of the present disclosure may also be utilized in offshore or subsea applications. The carrier 115 may include embedded conductors for power and/or data for providing signal and/or power communication between the surface and downhole equipment. The carrier 115 may include a bottom hole assembly, which may include a drilling motor for rotating a drill bit.

Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions. As shown below, the configuration may result in some transducers being employed as transmitters and others as transducers, such that acoustic signals are induced in the tubular at a transmitter, from which they propagate circumferentially about the tubular and are detected along the propagation at specific points by respective receivers. The configuration also results in the transformation of the signals to intermediate measurements, and through the specific combination of these various intermediate measurements, provides a measurement of physical properties of the casing.

Figure 1B:
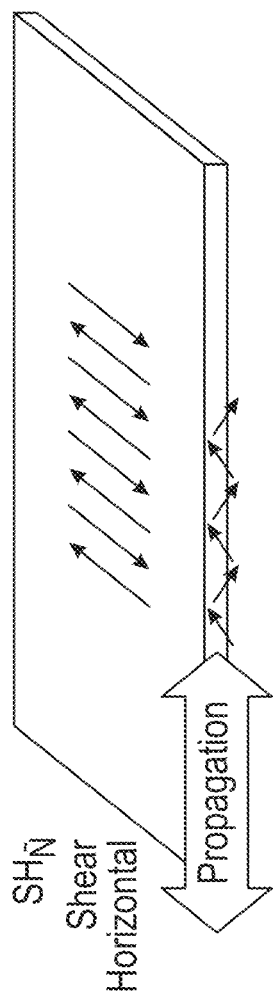
FIG. 1B illustrates horizontal shear (SH) wave propagation across a plate thickness.

FIG. 1B illustrates horizontal shear (SH) wave propagation across a plate thickness. The shear-horizontal (SH) wave propagates along the plate, but its wave stress (or particle) displacement is along the broad horizontal plane (or at 90 deg perpendicular to the cross-sectional thickness plane). That is, horizontal shear wave propagation is along the plate, but wave stress (or particle) displacement is perpendicular to the wall cross section plane ('inward and outward').

Figure 1C:
FIGS. 1C-1E illustrate SH mode particle displacement fields across a plate thickness.
Figure 1D:
Figure 1E:

FIGS. 1C-1E illustrate SH mode particle displacement fields across a plate thickness. As shown, Referring to FIG. 1C, in the fundamental mode (SH0), particle displacement is uniform to the plane of the wall cross-section. The SH0 fundamental mode particle displacement is at inward and outward direction of the thickness plane, and is uniform across the thickness. Modes above the fundamental mode are referred to as higher order modes. Referring to FIG. 1D, in the first order mode (SH1), the particle displacement field is inward and outward with a horizontal nodal plane in the middle. The higher order SH1 mode displacement is at inward and outward periodic directions, but with a nodal (zero-displacement) plane in the middle of the thickness plane. Referring to FIG. 1E, in the fundamental mode (SH2), the particle displacement field has two horizontal nodal planes. The higher order SH2 mode displacement has more subset components inward and outward, and has two nodal planes perpendicular to the thickness plane.

Figure 2A:
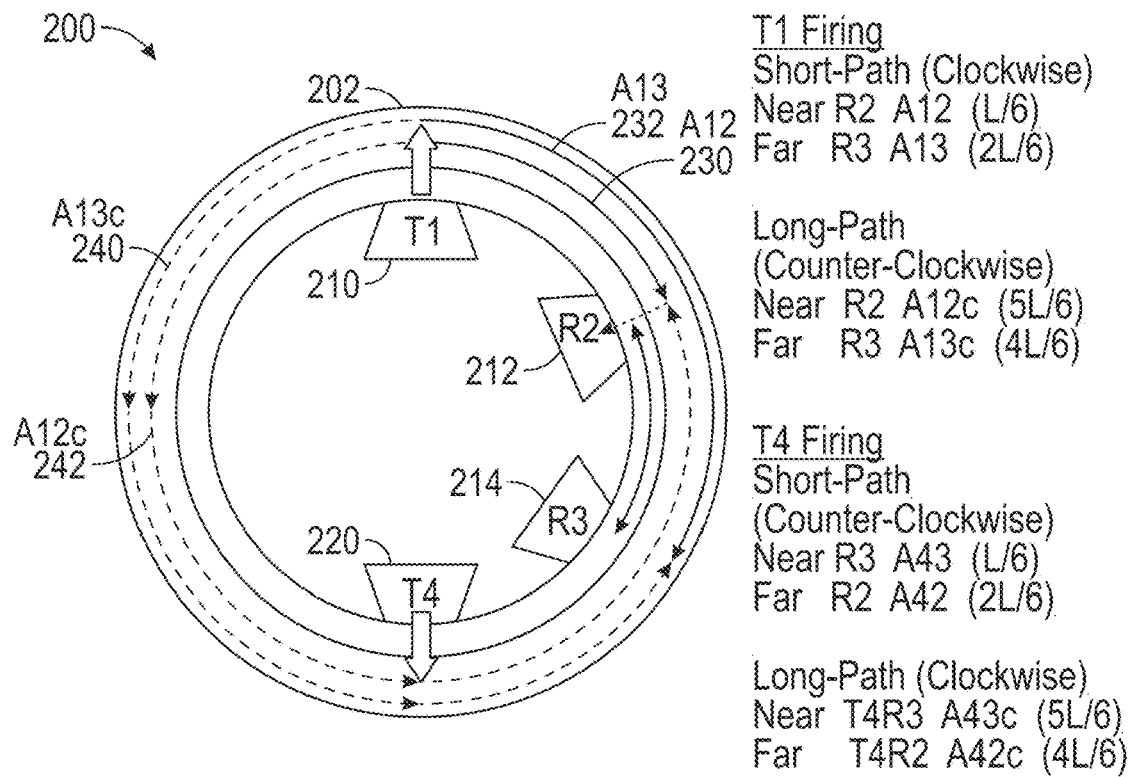
FIGS. 2A-2D show techniques of tubular evaluation in accordance with embodiments of the present disclosure.
Figure 2B:
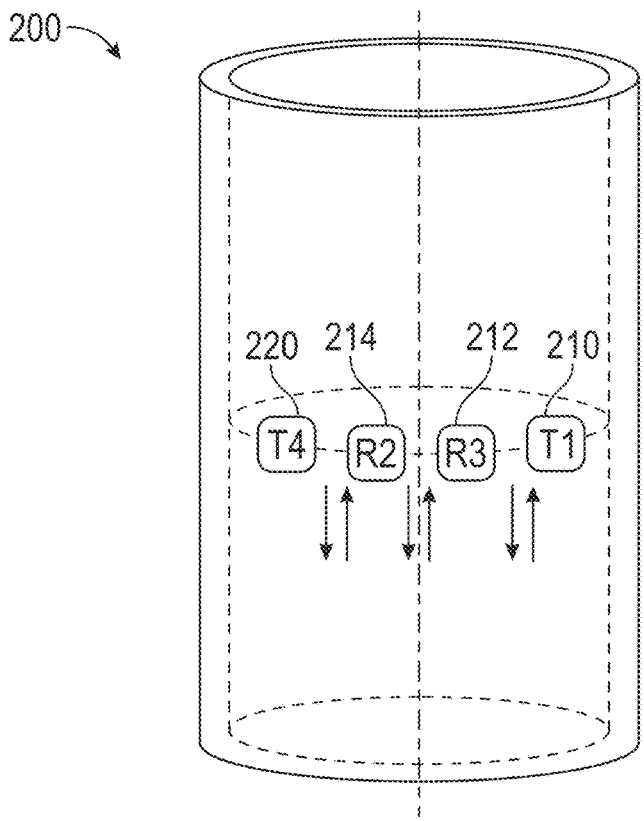

FIGS. 2A-2D show techniques of tubular evaluation in accordance with embodiments of the present disclosure. FIG. 2A shows an axial schematic view illustrating techniques of tubular evaluation in accordance with embodiments of the present disclosure. FIG. 2B shows a perspective schematic view illustrating techniques of tubular evaluation in accordance with embodiments of the present disclosure. FIGS. 2A & 2B show an acoustic system 200 with four horizontal shear transducers 210, 212, 214, and 220 placed on the inner diameter of the casing along a circumference of the inner diameter. Each SH transducer may be an EMAT transducer, and used as transmitter or receiver. The nominal transmitter and nominal receiver are azimuthally positioned on the inner casing wall. In particular implementations, operations may include a compensated measurement using two transmitters and two receivers. The transducers may be configured in operation as two SH transmitters 210 and 220 and two SH receivers 212 and 214. The receivers may be offset azimuthally, and may be evenly spaced, e.g., at 60 degrees apart, as shown in the figure. Note that L is the full-revolution path length, which is simply the circumference of the ID of the tubular. The receiver 212 is 60 degrees (path-length L/6) and the receiver 214 is 120 degrees (path-length 2L/6), both relative to the transmitter T1 (210).

In operation, the transmitter T1 fires and excites SH mode waves propagating circumferentially in each direction around the casing. The SH waves are received by the two receivers R2 and R3. For the waveforms received by the near (relative to T1) receiver R2 and the far receiver R3, each waveform contains SH signals propagated along a short path (solid path-lines A12 (230) and A13 (232)) and a long path (dashed path-lines A12c (240) and A13c (242)). As depicted in FIG. 2, the short path is that in which the waveform propagates in the clockwise direction, and the long path counterclockwise. It should be noted that in other configurations, the directions for the shortest path and longest path may be reversed such that the long path is clockwise.

The group velocity ($V_g$), frequency, and attenuation of an SH mode (SH1, or SH2) are estimated for the section of the tubular between the two receivers. The short-path 230, 232 or long-path 240, 242 signal responses may be used for SH group velocity, frequency and attenuation measurements. Similarly, when the transmitter T4 fires, the receivers R3 and R2 waveforms also contain short-path SH signals (signals resulting from receiving waveforms traveling over the short paths 230, 232), as well as long-path SH signals (signals resulting from receiving waveforms traveling over the long paths 240, 242). Thus, for each measurement, the SH waves are induced in a casing, and the signals are received by at least two receivers.

Figure 2C:
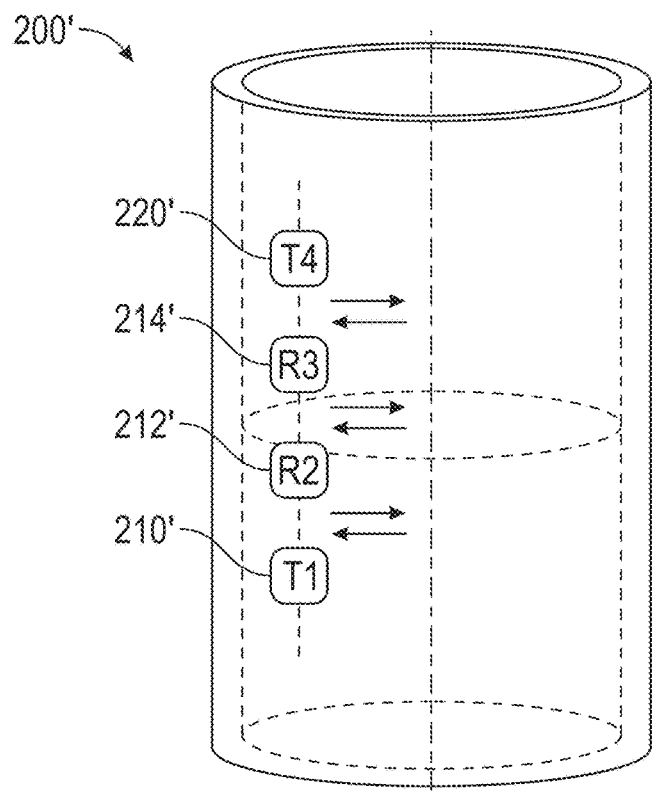
Figure 2D:
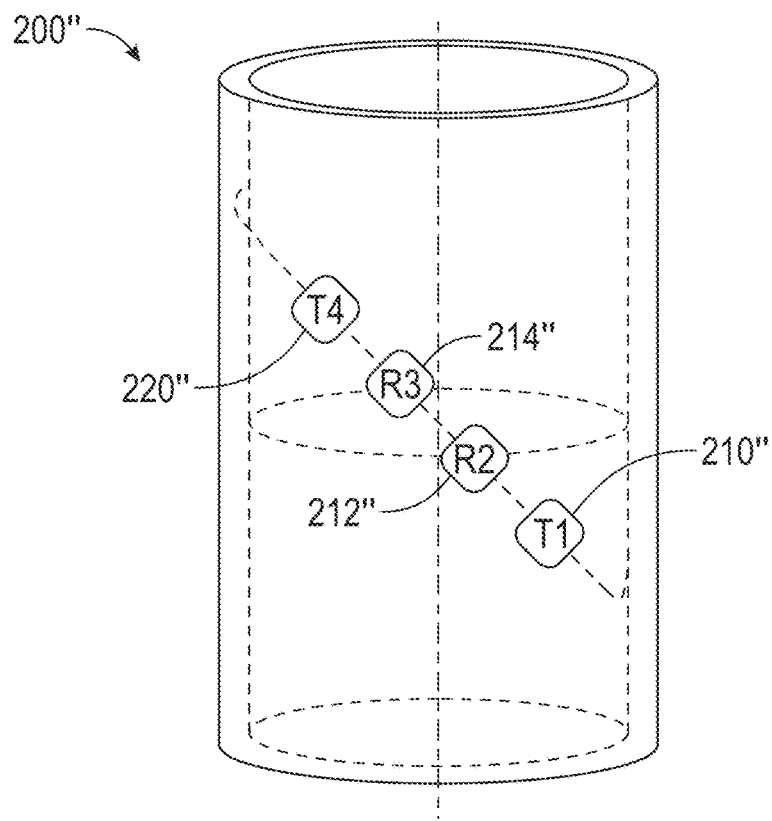

Other configurations employing the techniques of the disclosure are foreseen. FIG. 2C shows an acoustic system 200' with four horizontal shear transducers 210', 212', 214', and 220' placed along the inner pipe wall of the casing with an axial offset. The SH wave propagates axially and its particle displacement is along the circumference of the inner wall of the pipe. FIG. 2D shows an acoustic system 200" with four horizontal shear transducers 210", 212", 214", and 220" placed along the inner pipe wall of the casing with an azimuthal and axial offset. The SH wave propagates both azimuthally and axially.

Figure 3:
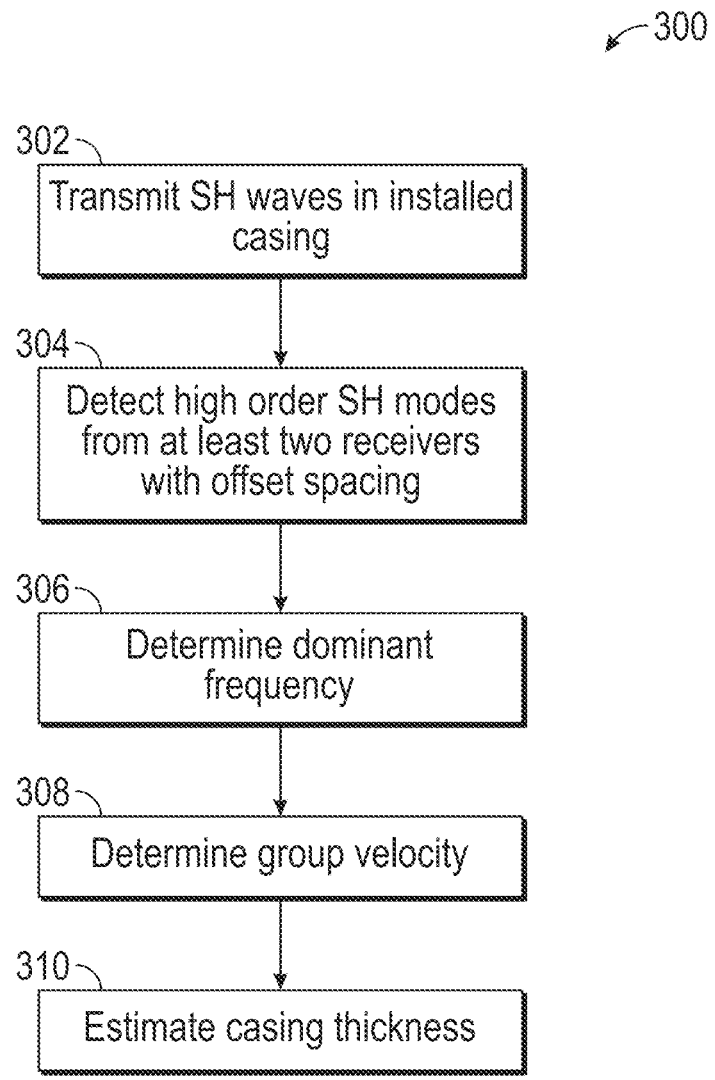
FIG. 3 shows a flowchart illustrating methods in accordance with embodiments of the present disclosure.

FIG. 3 shows a flowchart illustrating methods in accordance with embodiments of the present disclosure. Method embodiments may include detecting and evaluating wall thickness of steel casing from higher order shear-horizontal (SH1 or SH2) mode signal responses. Step 302 comprises transmitting SH waves in installed casing, which may be made of steel. Step 304 comprises detecting higher order SH mode signals (SH1 and/or SH2 signals) from at least two receivers with an offset spacing. Step 306 comprises determining the dominant frequency f of the received SH mode signal. Step 308 comprises determining the group velocity $V_g$ of the SH mode signal from the signal travel time delay and the spacing offset across the two receivers. Step 310 comprises estimating casing wall thickness h by applying an empirical model. This empirical model may be representative of the relation $$h = mV_g/(2f),$$

with a pre-determined mode factor m for a given higher order SH1 or SH2 mode.

The SH1 (or SH2 mode) signals are identified, gated, and processed to determine the mode group velocity and frequency. The tubular thickness is estimated from the measured SH1 group velocity, the SH1 mode frequency, and a SH1 mode factor. Alternatively, the casing thickness may be also estimated from the measured SH2 group velocity, the SH2 mode frequency, and a SH2 mode factor. The mode factors may be calibrated from measurements from known thickness or determined from theoretical model. For nearest path operation (e.g., waveforms from the transmitter passing the near receiver on the path to the far receiver), in some embodiments the frequency in the formula may be the averaged frequency of the far receiver signals for both directions of propagation (clockwise and counter-clockwise). For group velocity, it may be preferred in some implementations to use cross-correlation of the gated signals to estimate the time delay of near and far receiver signals. The relationship suggested in casing thickness determination is h=m $V_g$/(2f), where the mode factor m=2.0-2.25 for SH1 mode, m=3.0-3.3 for SH2 mode, for casing thickness range 0.32-0.53 inch tested, and $V_g$ and f are the group velocity and frequency for the mode.

The SH1 (and or SH2) mode signals in the received waveforms may be analyzed and identified from temporal-frequency responses using time-frequency method such as spectrogram. Alternatively, the SH1 (and or SH2) mode may be also identified from casing cylindrical modeled waveforms. The identified SH mode signals from the near and the far receiver are then gated and processed for SH mode group velocity and frequency.

From the time delay for the short-path SH1 mode (or SH2 mode) from the near and the far receivers, and the spacing between the two receivers, SH mode group velocity may be determined. The received signals for a SH mode (SH1 or SH2) by the two receivers, from T1 firing, and from T4 firing, are used to calculate the compensated attenuation in the section between R2 and R3.

In some embodiments, the time delays of the SH mode signals (SH1 or SH2) from the near and far receivers for the T1 firing and for the T4 firings are detected using cross-correlation of near and far signals, and then averaged to reduce error, for each of the T1 and T4 transmitter firings.

The group velocity for the SH mode can be obtained by dividing the nominal distance between the two receivers by the averaged time delay.

Figure 4:
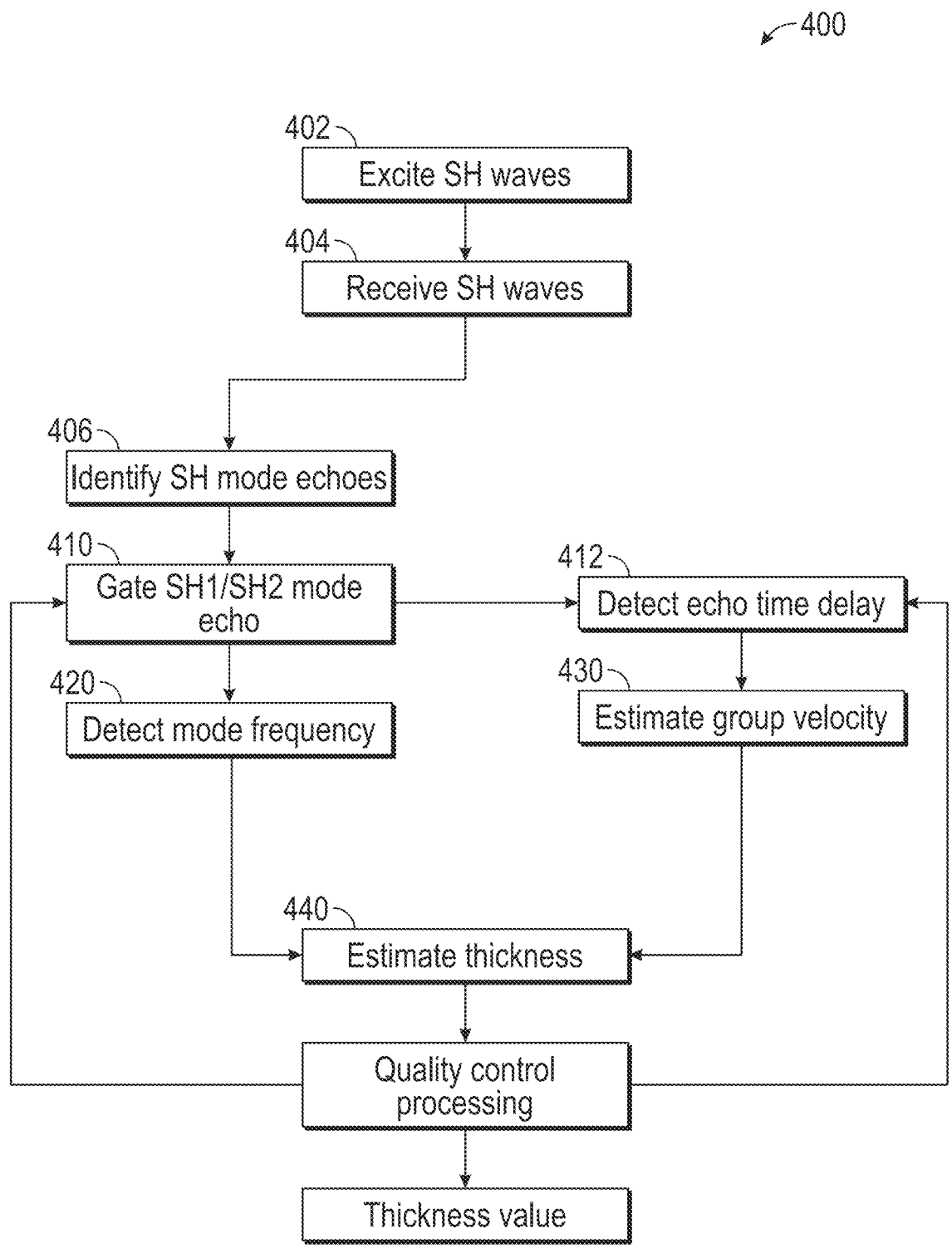
FIG. 4 is a flowchart illustrating methods in accordance with embodiments of the present disclosure.

FIG. 4 is a flowchart illustrating method embodiments of the present disclosure. Step 402 comprises exciting horizontal shear waves (SH waves) in the casing, which may be carried out as described above. Step 404 comprises receiving the SH waves at a plurality of receivers. Step 406 comprises identifying SH1 or SH2 mode signals in the received waveforms. Step 406 may be carried out by waveform analysis. The SH1 (and or SH2) mode signals in the received waveforms may be analyzed and identified from temporal-frequency responses using time-frequency method such as spectrogram. Alternatively, the SH1 (and or SH2) mode may be also identified from casing cylindrical modeled waveforms.

At step 410 the identified SH mode signals from the near and the far receiver may then be gated and processed for SH mode group velocity and frequency. Step 410 may be configured to select a clean mode (SH1 or SH2) with less interference from other modes. For example, methods may include iterative evaluation of signals, beginning, for example, with the signals attributable to short-path propagation ('short path arrivals'). If long-path signals exhibit good signal strength and less mode coupling, they may be selected instead.

Step 412 comprises detecting the time delay. The time delays of the SH mode signals (SH1 or SH2) from the near and far receivers for the T1 firing and for the T4 firings may be detected using cross-correlation of near and far signals, and then averaged to reduce error, for each of the T1 and T4 transmitter firings. Step 420 comprises detecting the mode frequency. A preferred method for determining the SH1 (or SH2) mode frequency is to process FFT of the far receiver arrival gated and detect the peak frequency of the FFT spectrum. The two peak frequencies from the T1 and T4 firing are averaged. The FFT from the far receiver signal, in comparison to that from the near receiver arrival, may have less noise from transmitter firing and SH0 coupling. In some implementations, the far arrival frequency and the averaged frequency from the clockwise and the counter clockwise far arrivals may be used.

Step 430 comprises estimating group velocity. SH mode group velocity may be determined from the time delay for the short-path SH1 mode (or SH2 mode) from the near and the far receivers, and the spacing between the two receivers. The received signals for SH mode (SH1 or SH2) by the two receivers, from each of the T1 firing and the T4 firing, may be used to calculate the compensated attenuation in the section between R2 and R3. The group velocity for the SH mode can be obtained by dividing the nominal distance between the two receivers by the averaged time delay.

In some implementations, the EMAT SH configuration comprises six evenly spaced transducers around the casing ID, e.g., at 60 degree spacings. The path may be determined from the full-revolution path length L, which is simply the circumference of the ID of the tubular, e.g., 1/6L(N) and 2/6L(F) for Short Path in one propagation direction (e.g., clockwise), or 5/6L (N) and 4/6L(F) for Long Path in the other propagation direction (e.g., counter-clockwise). For a casing with a known nominal casing ID or one determined a priori (e.g., using other caliper methods), an averaged distance receiver based on the ID-OD mid-plane distance, or based on casing ID, may be used. The transducer spacing between two adjacent transducers may vary slightly (e.g., in operation of a six-transducer EMAT SH sensor tool) due to the tool movement, particularly in deviated wells. One technique for reducing this effect may include summing up the delay times from the six measurement sectors in total, determining an averaged group velocity, and then using the average group velocity to correct and compensate for receiver spacing variations between individual sectors. The averaged group velocity thus determined would reduce the error caused by receiver spacing variation.

Step 440 comprises estimating the thickness of the tubular. The SH mode group velocity $V_g$ and the frequency f, a predetermined mode factor m, may be used to estimate the casing thickness h, using the model described above. The mode factor m may be calibrated from measurement or determined from analytical model. It is a constant factor dependent upon the SH mode and the casing thickness ranges used.

In some applications, in combination with the technique described immediately above, it may be beneficial to use the peak frequency and the group velocity to also estimate parameters of interest using one or more secondary models, such as, for example, a plate model and a shear resonance model, and to compare the results. At step 450, quality control of processing may also be carried out, which result in the modification of parameters. For example, it may be beneficial to adjust gate windows to reduce mode interference, adjust arrival delay time (by up to half cycle) to reduce cycle skipping error in time delay detection, and so on.

Another aspect of the disclosure is feed-back adaptive transmitter frequency optimization method. The drive frequency used on an EMAT SH tool may be selected based on free-pipe theoretical modeled SH responses and on a known nominal thickness and OD. When casing wall varies (due to wear, erosion, or drift) from the nominal thickness, the SH mode frequency would also shift (i.e. out of drive pulse bandwidth) and cause signal drop. The method may include generating a SH1- (or SH-2) dominant wave using a SH1 (or SH2) frequency that was previously determined for a nominal casing thickness, receiving SH signals, detecting the group velocity and frequency of SH1 (or SH2) signals, and recalculating the casing thickness using the above model.

Additionally or alternatively, the method may comprise steps of 1) firing an initial wide-band pulse based on the nominal (averaged) casing thickness, and 2) detecting the frequency of dominant SH modes, and 3) firing a new narrow-band pulse at the detected center frequency, 4) detecting the SH mode frequency and group velocity and calculating casing thickness. The initial drive pulse may be a tone-burst of a few cycles, or preferably a wide-frequency-band short pulse.

Another preferred signal enhancing method for obtaining a clean SH mode for thickness detection involves firing multiple drive tone-burst pulses at incremental frequencies and at incremental pulse cycles, and determining the instantaneous phase and frequency responses of the various SH mode signals in the near and the far received waveforms. The instantaneous responses may be used in selecting the frequency and the pulse cycle that yielded the largest phase and frequency differences in the selected SH mode with the other modes (i.e., a SH1 mode of interest with least coupling from SH0 and SH2 modes; or a SH2 mode of interest with least coupling from Sh0 and SH1 mode). SH1 (or SH2) mode signals may be selected to result in less coupling or contamination by other modes, thereby enabling more reliable frequency and group velocity determination, which provides more accurate casing thickness estimates.

Figure 5:
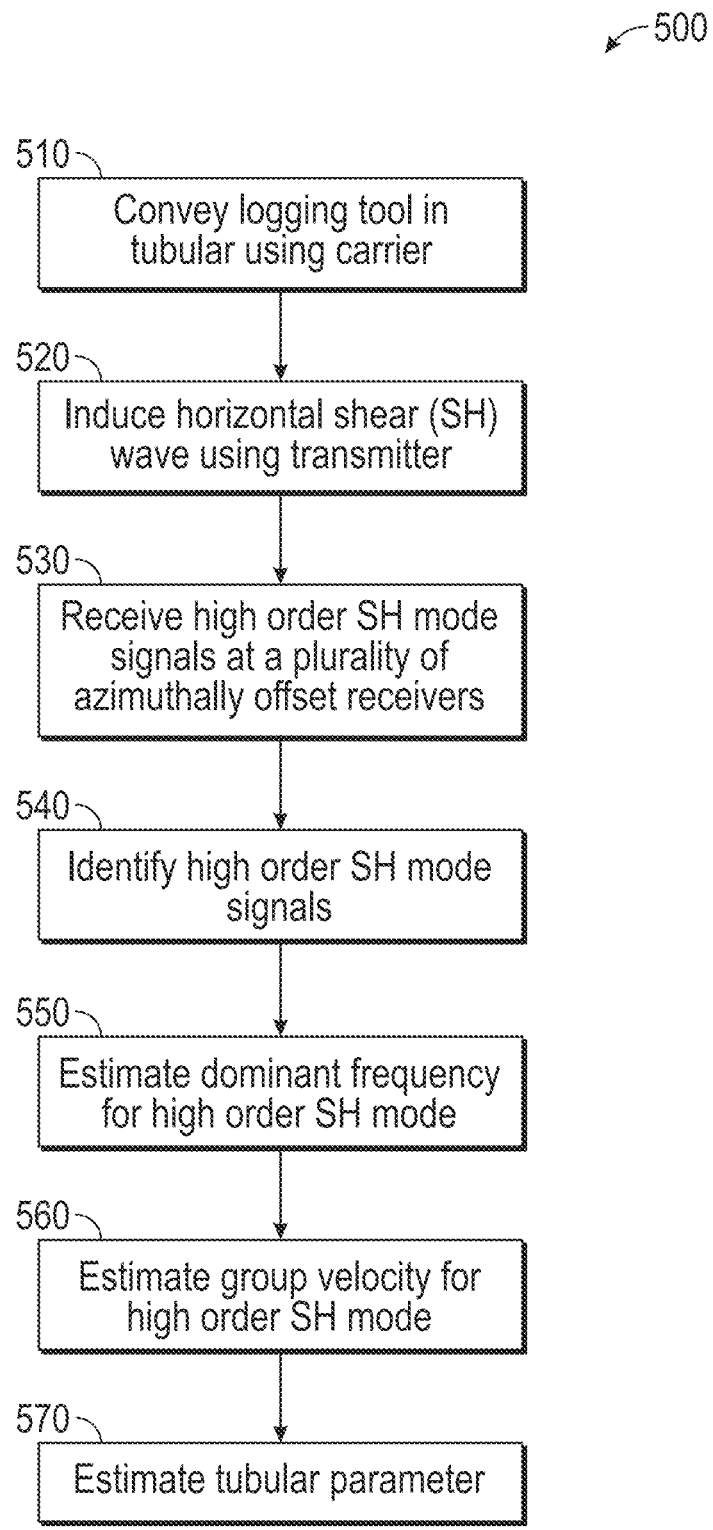
FIG. 5 shows a flowchart illustrating methods in accordance with embodiments of the present disclosure.

FIG. 5 shows a flowchart 500 illustrating methods in accordance with embodiments of the present disclosure. In optional step 510, a logging tool is conveyed in a tubular using a carrier. The tubular may be located in a borehole in an earth formation or above ground. The tubular may be casing installed in a borehole, production tubing, and so on. The borehole may be filled with downhole fluid. Step 520 may include inducing a horizontal shear (SH) wave using a transmitter. Step 530 may include receiving higher order SH mode signals at a plurality of azimuthally offset receivers. At step 540, at least some of the higher order SH mode signals received are identified as higher order SH mode signals responsive to a higher order SH mode engendered by the horizontal shear (SH) wave, such as the SH1 mode. The at least one higher order horizontal shear wave mode has a propagation that is substantially circumferential. Step 550 comprises estimating a dominant frequency for higher order SH mode from the identified higher order SH mode signals. Step 560 comprises estimating a group velocity for the higher order SH mode from the higher order SH mode signals. Step 570 comprises estimating a tubular (e.g., tubing wall thickness) parameter using the dominant frequency and the group velocity. The tubular parameter may include at least one of: i) location of the tubular; ii) thickness of the tubular; and iii) at least one property of a defect of the tubular; iv) a bond of the tubular with cement; v) outer diameter of the tubular; and vi) location of a tubular joint. The tubular parameter is estimated independent of the fundamental horizontal shear wave mode (SH0).

Estimating the group velocity may be carried out by estimating a time delay between a first receiver of the plurality and a second receiver of the plurality comprising employing a cross-correlation between a first portion of the higher order SH mode signals from the first receiver and a second portion of the higher order SH mode signals from the second receiver.

As noted, the plurality of receivers may include a first receiver located a first distance from the transmitter along a shortest circumferential path and a second receiver located a second distance from the transmitter along another shortest circumferential path, wherein the second distance is greater than the first distance. Estimating the dominant frequency may be carried out by performing a Fast Fourier Transform (FFT) of a portion of the higher order SH mode signals received at the second receiver to generate a FFT spectrum, and detecting a peak frequency of the FFT spectrum.

Optional methods may include using the parameter of interest to estimate a characteristic of the borehole, the near-borehole formation, or infrastructure installed in the borehole. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further open-hole operations in the earth formation in dependence upon formation information, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Testing of the techniques of the present disclosure with EMAT-based sensor tools (e.g., the INTeX tool manufactured by Baker Hughes, a G.E. Company) showed vast improvement over conventional methods. The thickness results obtained from the proposed model were in good agreement with four nominal known casing thicknesses over 0.318-0.53 inch. Below are four test examples illustrating the performance of the new method.

Figure 6B:
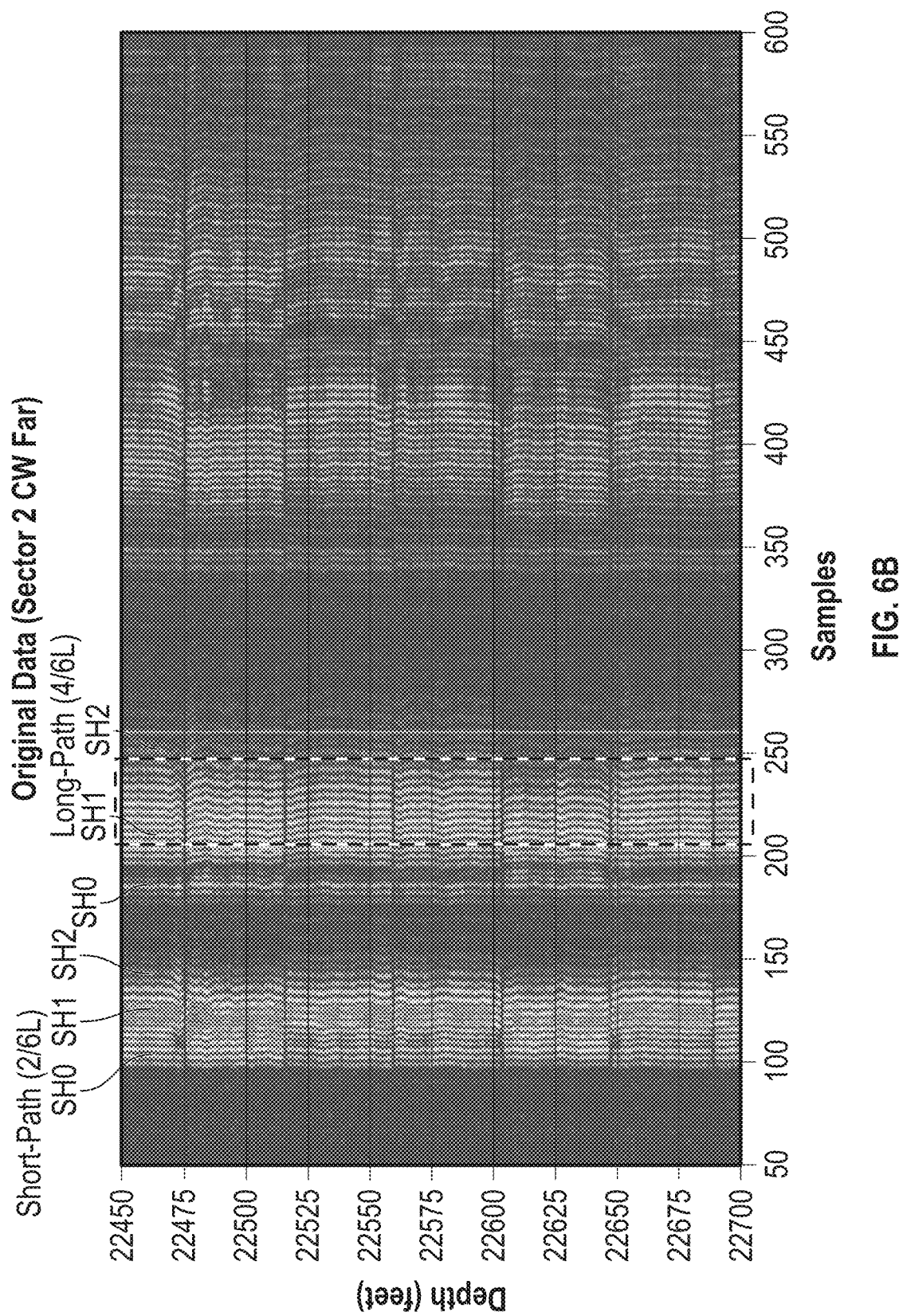

FIGS. 6A-6F show test results for the SH1 mode using short- and long-path signals in casing with 7-inch OD and 0.53 inches thickness in mostly free pipe. The tool used 2 cycles of burst at 179 kHz to excite the SH1 mode. FIG. 6A shows measured waveforms acquired at a near receiver. FIG. 6B shows measured waveforms acquired at a far receiver. As is shown, the long-path SH1 signals around 5/6L from the near receiver, and the long-path SH1 signals around 4/6L from the far receiver were both gated and processed for thickness calculation, using a gate index of 245-280 for the near receiver and 210-250 for the far receiver.

Because of dispersion, the SH0 arrivals are slightly ahead of the SH1 signals, while the SH2 arrivals are later than the SH1 mode arrivals. The long-path SH1 arrivals are substantially clean and display good separation with the SH0 and SH2 modes. These results are in agreement with those from a cylindrical casing model, as described above, which qualitatively predicted the measured responses at the near and far receiver for the long-path SH1 arrivals.

Figure 6C:
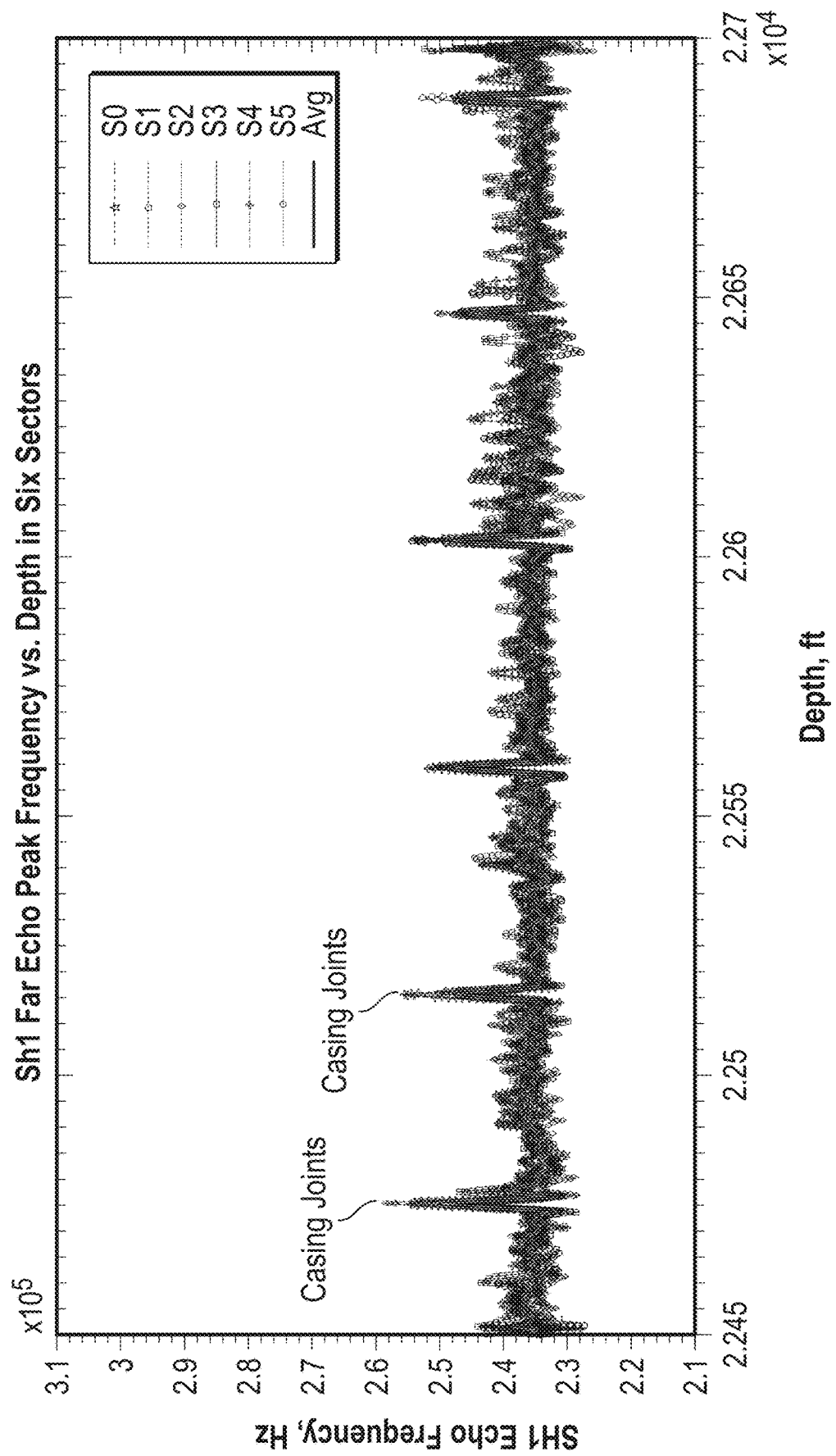
Figure 6D:
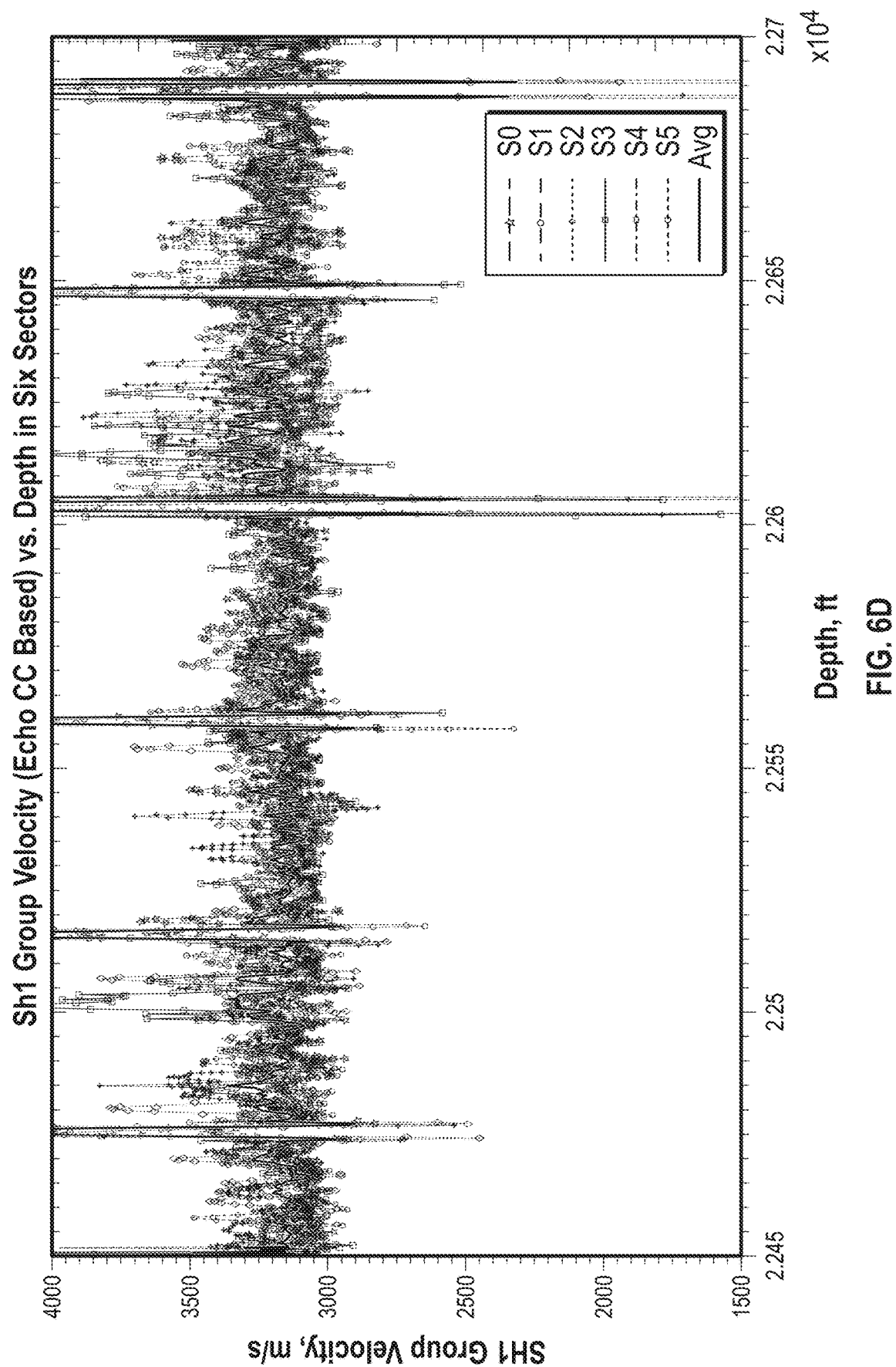

FIG. 6C shows the measured long-path SH1 mode frequency. FIG. 6D shows the measured SH1 mode group velocity. The six curves from six 60-deg azimuthal sectors around casing ID are shown along with six-sector averaged results. The SH1 frequency is about 235 kHz, which is significantly higher than the center frequency 179-kHz drive burst. The casing joints are apparent from the large frequency and velocity spikes.

Figure 6E:
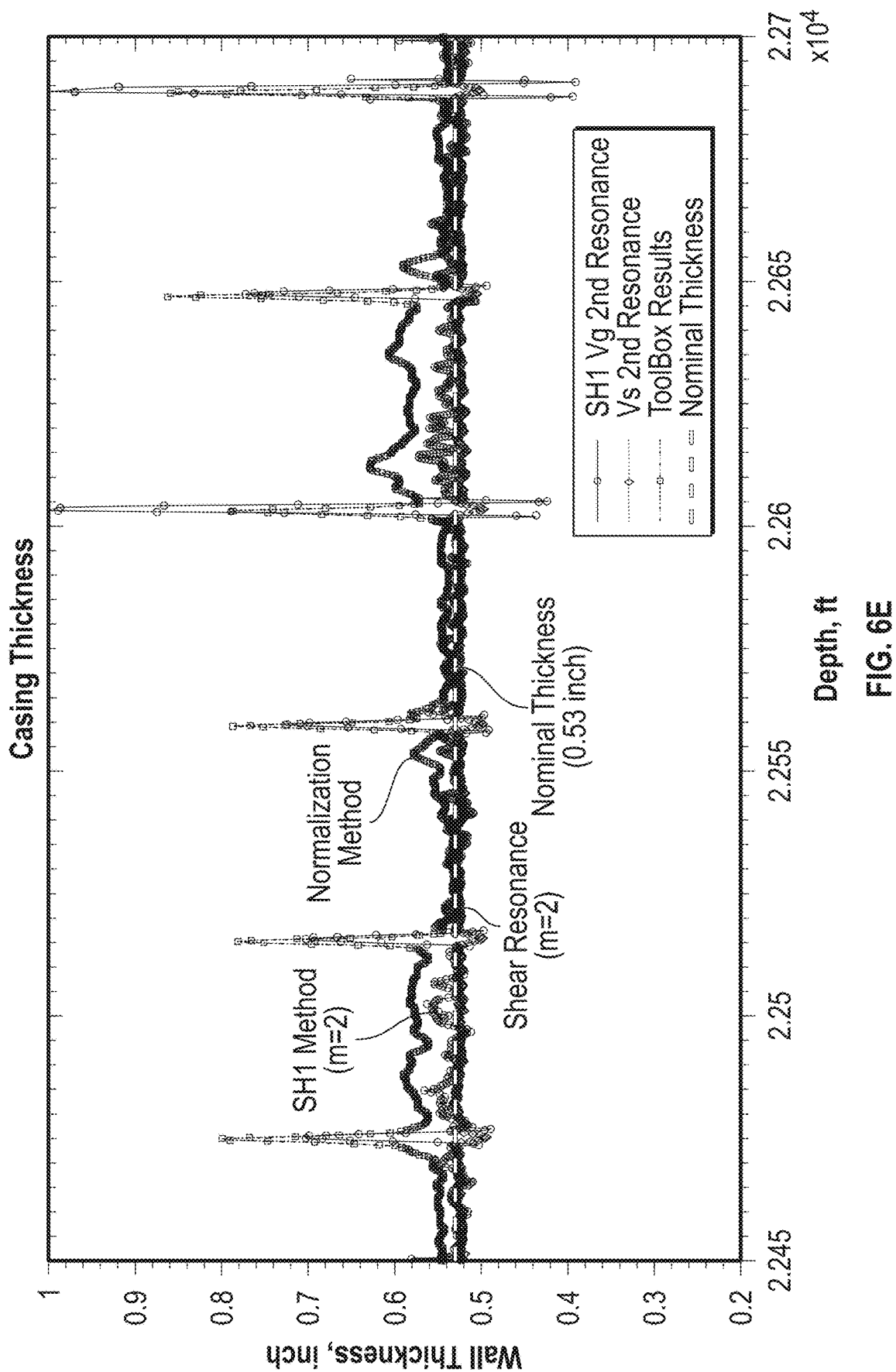
Figure 6F:
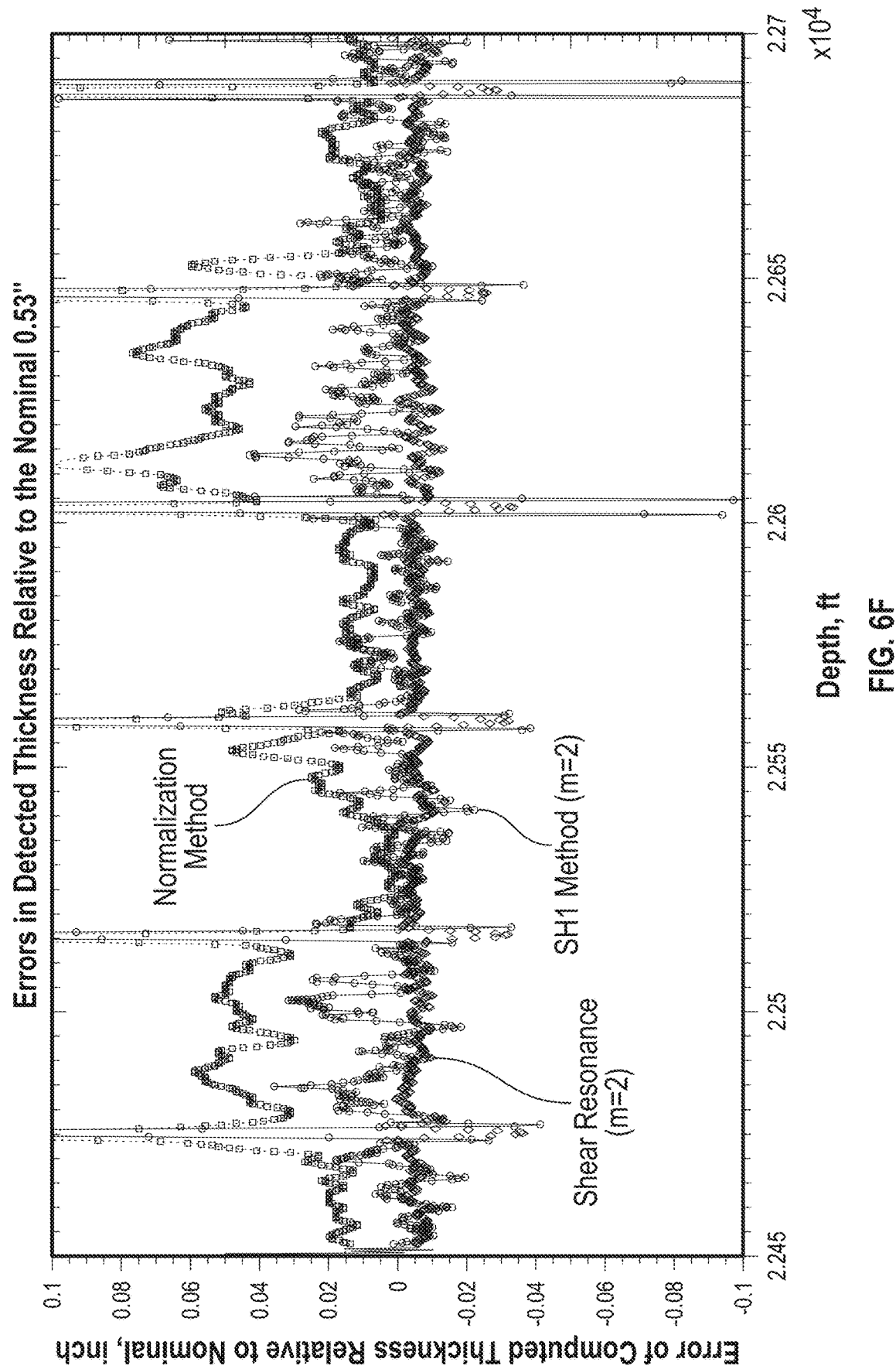

FIG. 6E shows detected thickness in contrast to nominal thickness. FIG. 6F shows error of detected thickness in contrast to nominal thickness. The detected thickness results show the higher order shear wave method of the present disclosure (thickness $h=mV_g/(2f)$, m=2.0 in black) to be in close agreement with the known nominal 0.53 in. The shear resonance results (thickness $h=mV_s/(2f)$, m=2, in red) were quite flat and also agreed well. These values may be contrasted with thickness values calculated from the plate model, which resulted in significant overestimation. The averaged errors in the thickness estimate for the SH1-method were within 0.01 inch.

FIG. 7A and FIG. 7B show well test results for SH1 mode using short-path signals in casing with 7-inch OD and 0.53 inches thickness in mostly free pipe. The tool used 2 cycles of burst at 267 kHz to excite both SH1 and SH2 modes. FIGS. 7A & 7B show short-path waveforms acquired at the near and far receiver, respectively, over a depth range from 22450 to 22700 feet. The short-path SH1 signals around 1/6L from the near receiver and those around 2/6L from the far receiver were gated and processed for thickness calculation. The SH1 arrivals are strong and well separated from the SH0 mode at the front of the packet and the SH2 mode at the end of the packet.

Figure 7C:
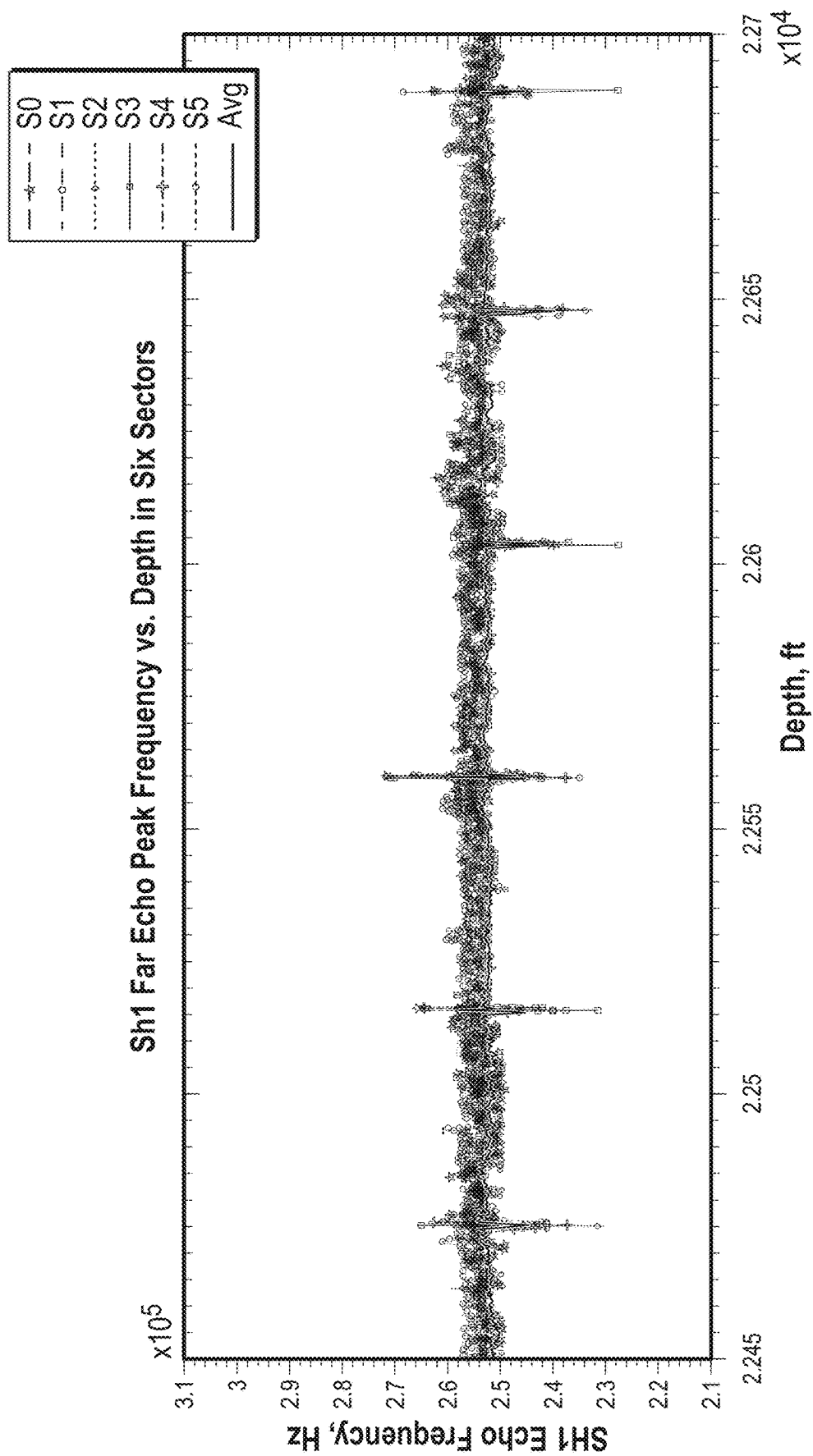
FIGS. 7C & 7D show the short-path SH1 mode frequency and the SH1 group velocity.
Figure 7D:
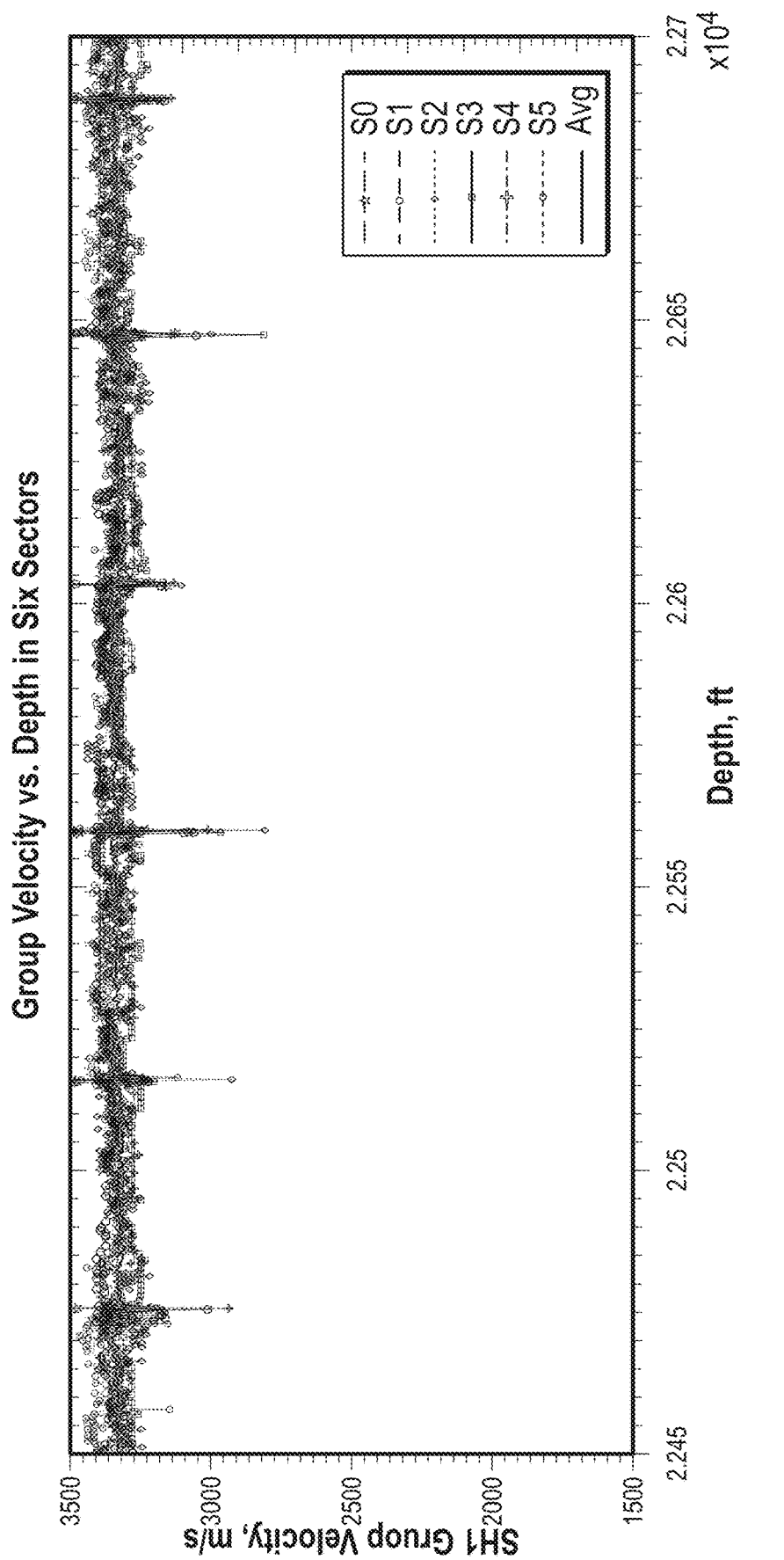
Figure 7E:
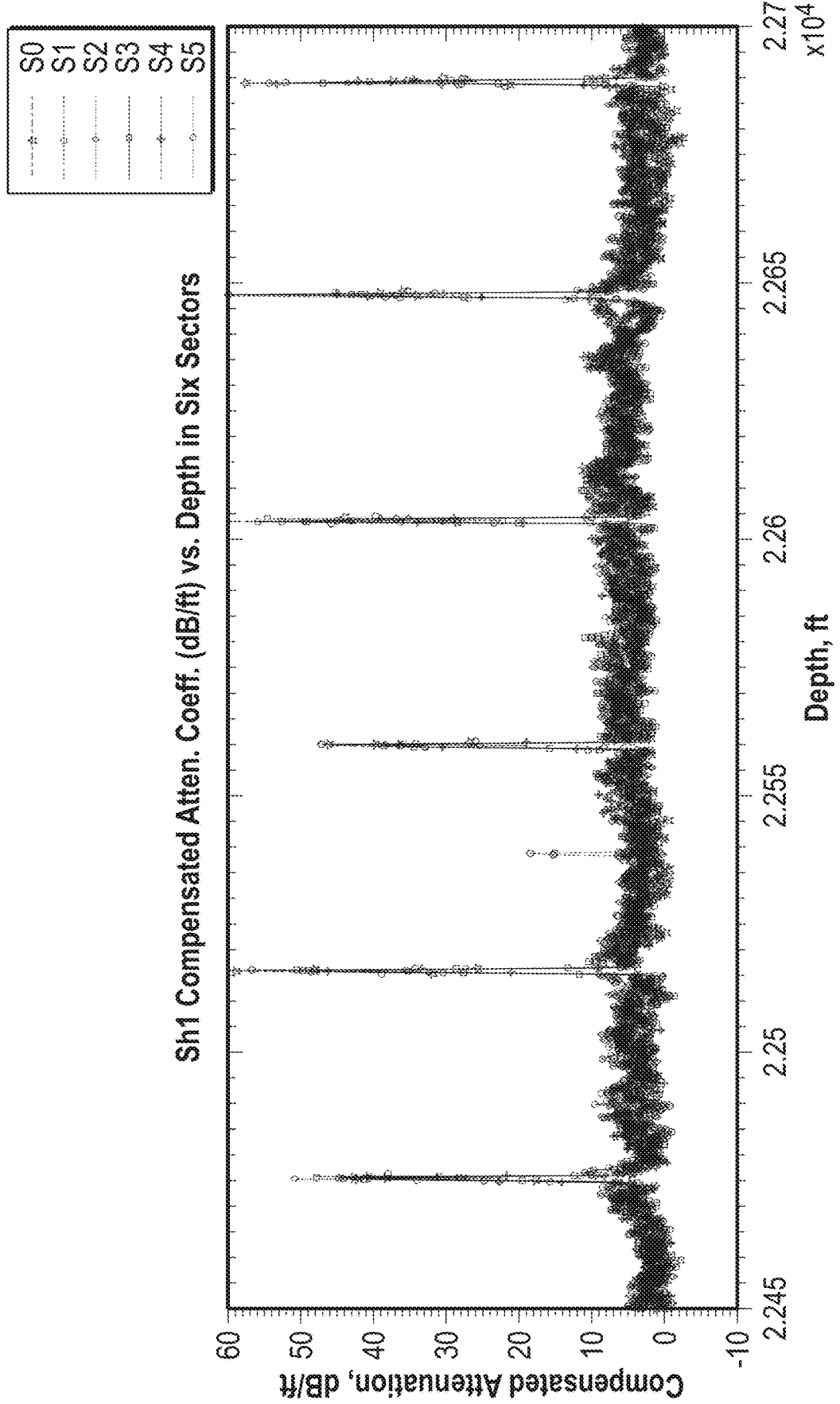
FIGS. 7E & 7F show compensated short-path attenuation and casing thickness.
Figure 7F:
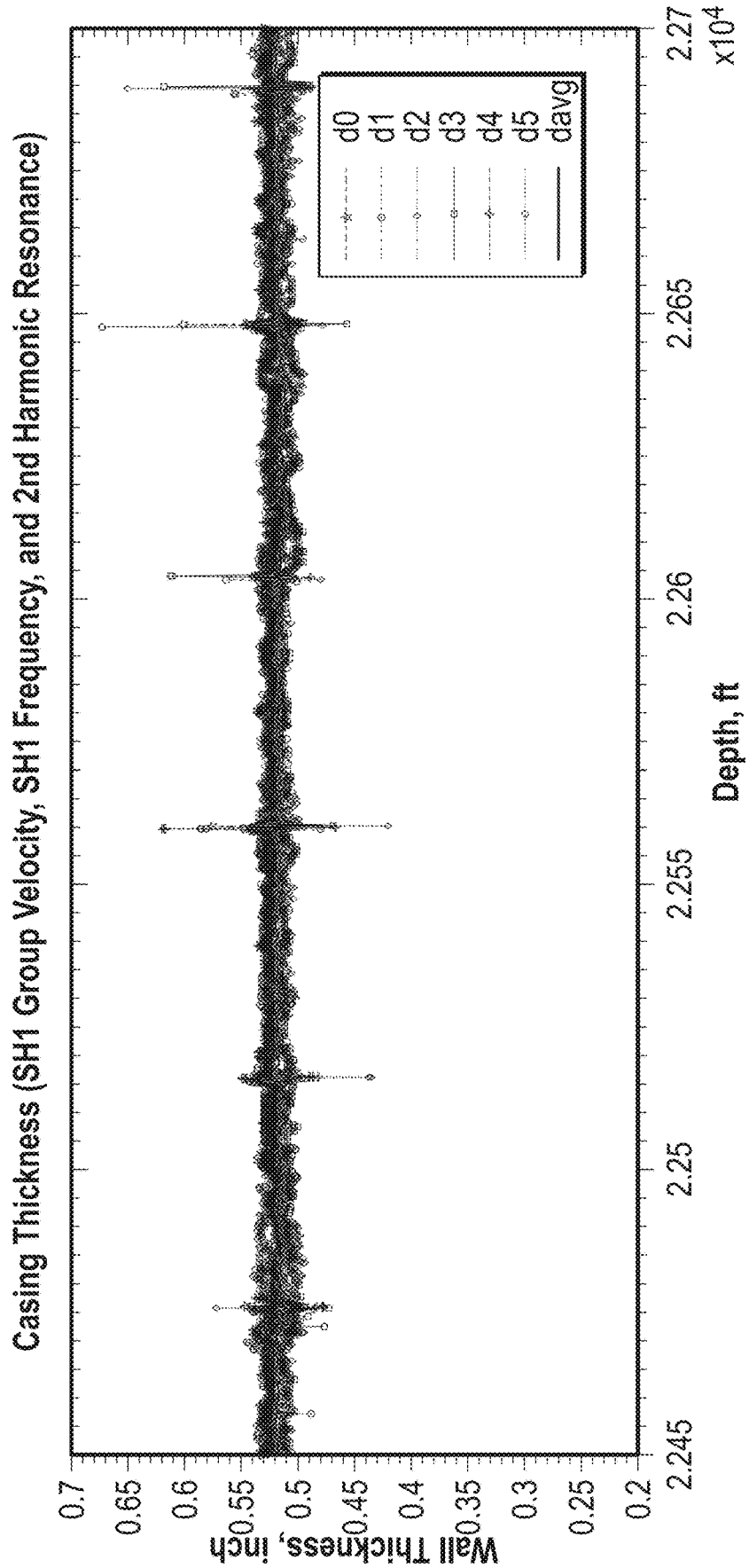

FIGS. 7C & 7D show the short-path SH1 mode frequency and the SH1 group velocity. SH1 frequency and group velocity responses display low scattering, as compared to the SH2 responses discussed in further detail below with reference to FIGS. 8B & 8C. The down-shift in the SH1 mode frequency of ~255 kHz from the drive 267 kHz is apparent in FIG. 7D. The short-path SH1 signals have less attenuation and stronger signal than the long-path SH1 signals. Further, the high excitation frequency 267 kHz also excites stronger SH1 signals than those from the 179 kHz. The location of the casing collars are easily observed from variations in the frequency and group velocity. FIGS. 7E & 7F show compensated short-path attenuation and casing thickness. The SH1-method thickness results for the six 60-deg sectors were quite good, with a variation band about 0.025 inch, or about 5% of 0.53 inches (FIG. 7F).

Figure 7G:
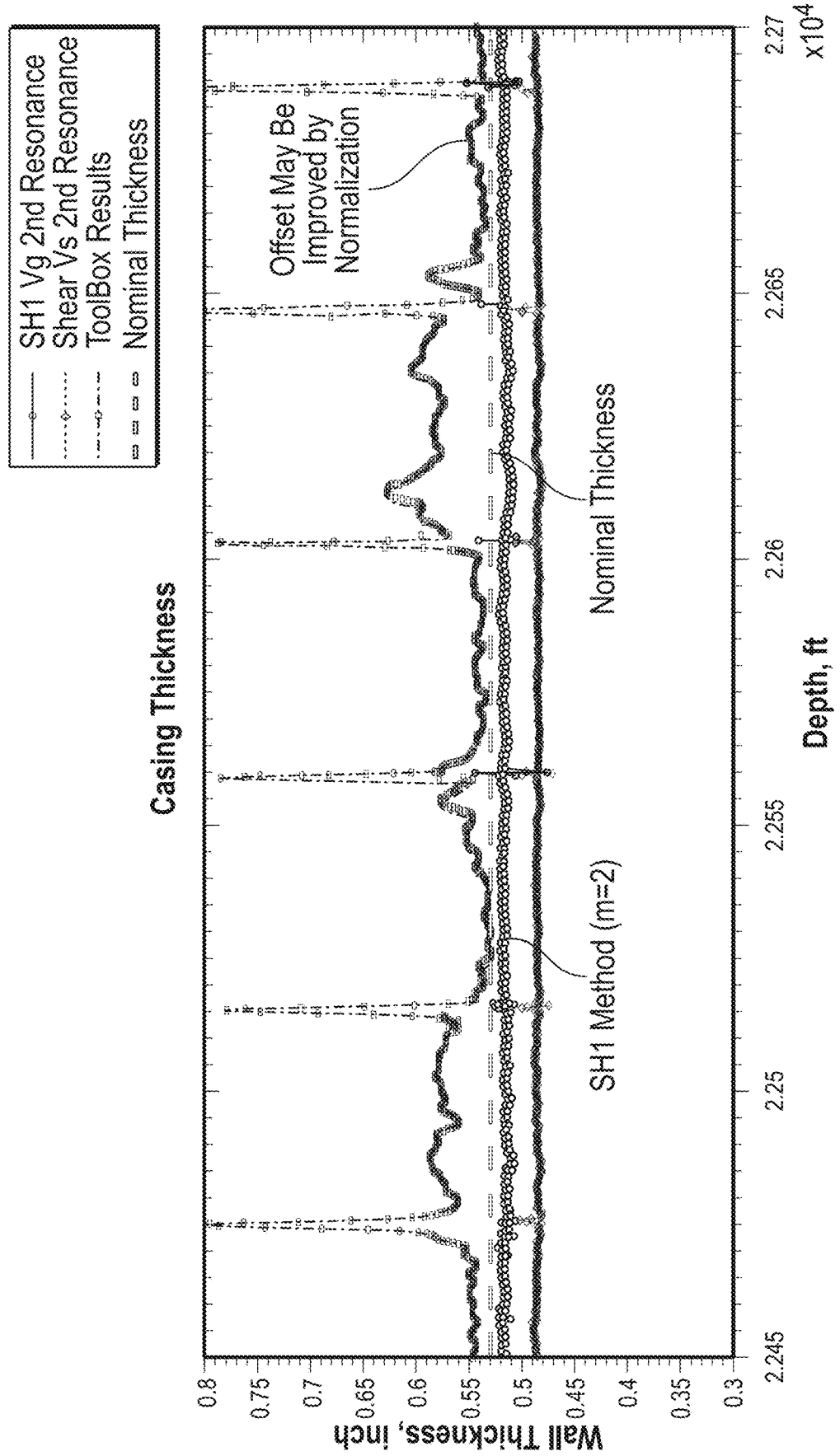
FIG. 7G shows detected thickness in contrast to nominal thickness.
Figure 7H:
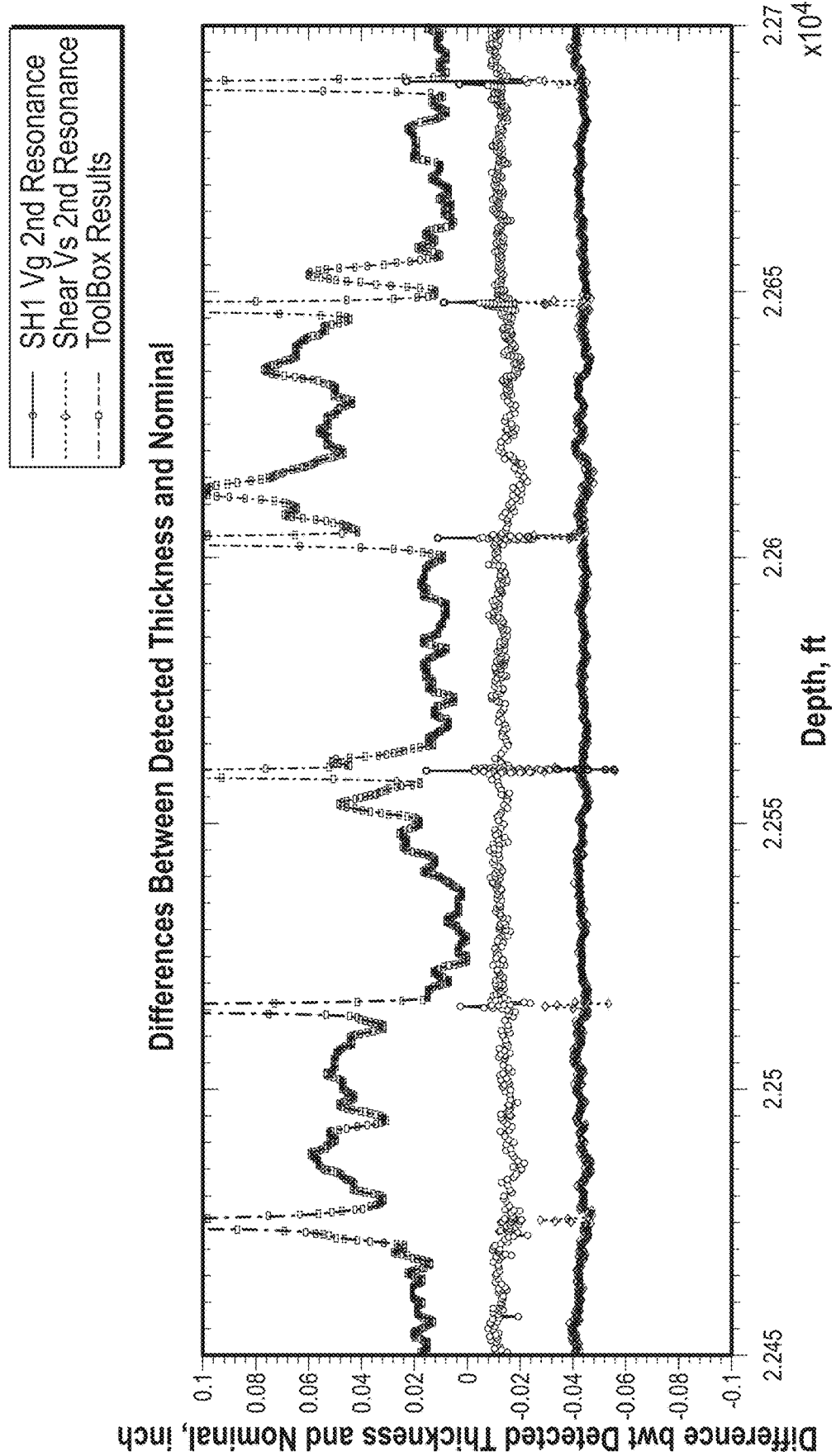
FIG. 7H shows error of detected thickness in contrast to nominal thickness.

FIG. 7G shows detected thickness in contrast to nominal thickness. FIG. 7H shows error of detected thickness in contrast to nominal thickness. The averaged thickness of the new method (in black) is in good agreement with the nominal, comparing to the shear wave method (m=2) and the tool calibration method. The SH1 method (m=2) had an averaged error of approximately –0.015 inch (–3% of the nominal 0.53 inches). The shear method results were underestimated and with a larger error of –0.045 inch. The plate model estimated thickness was significantly high (0.80"-1.0") and is not shown here.

Group velocity dispersion may be used to perform quality control on the measured data. The measured SH1 group velocity was clustered around 0.53 inch (estimated thickness), and expectedly increased with casing thickness. Also expectedly, the SH1 mode frequency was lower with an increase in thickness. Another useful way to evaluate group velocity dispersion is to plot the SH1 group velocity as function of fh (product of the measured frequency and the estimated thickness).

For the examples above of the near and far receiver waveforms, the short-path SH2 signals around 1/6L from the near and the around 2/6L from the far receiver, were gated and processed for thickness calculation. The near- and far-receiver waveforms are shown in FIG. 8A and FIG. 8B. Because of high attenuation, the SH2 arrivals were weaker than the SH1. They overlapped with the SH1 for the near receiver and the far receiver. The theoretical waveforms indicated that the short-path SH2 were close to the SH1 in the front for the near receiver, and also overlapped with the SH0/SH1 in the tail for the far receiver. Thus short-path SH2 arrivals gated would contain some coupling from the SH0 and SH1 modes.

Figure 8C:
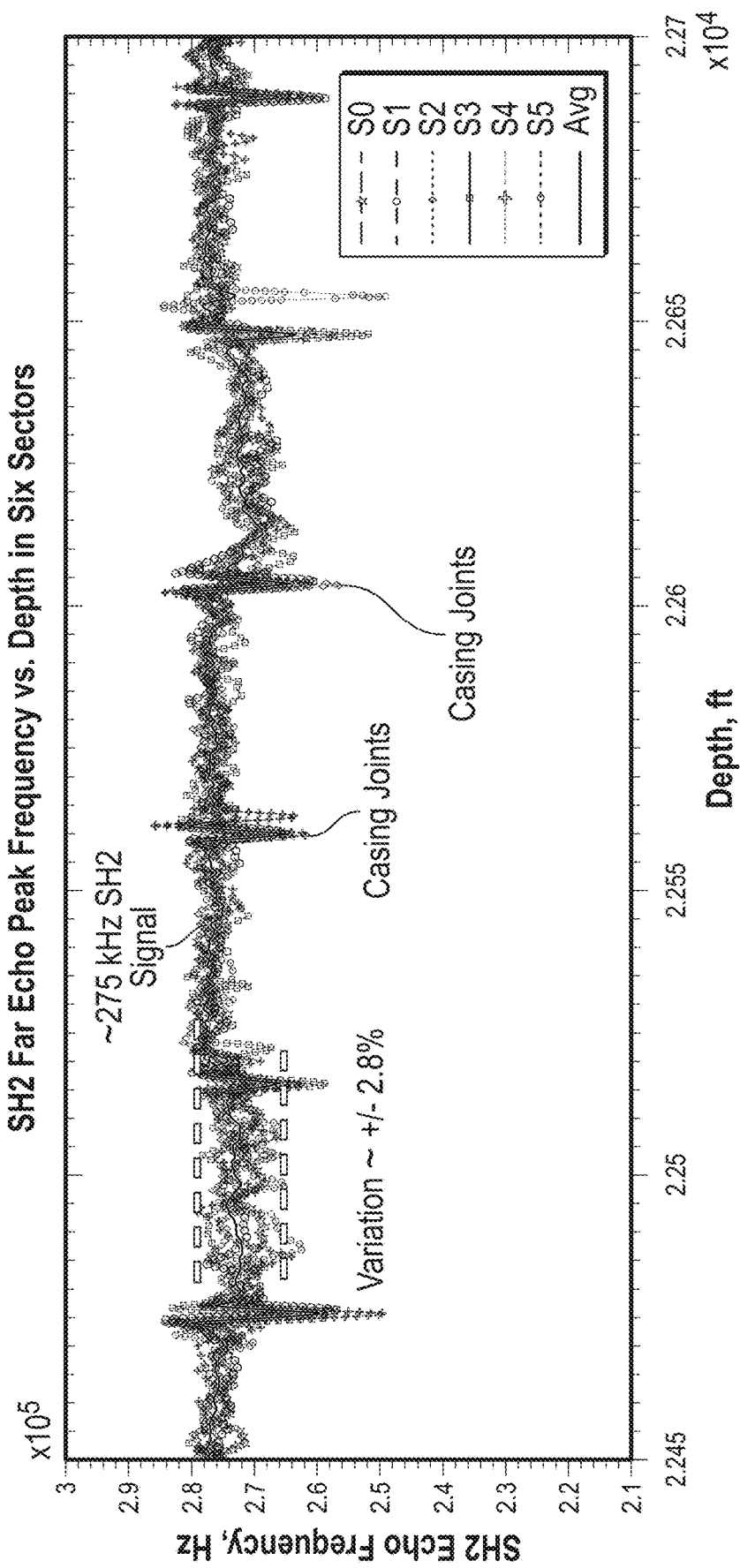
FIGS. 8C-8E show additional test data.
Figure 8D:
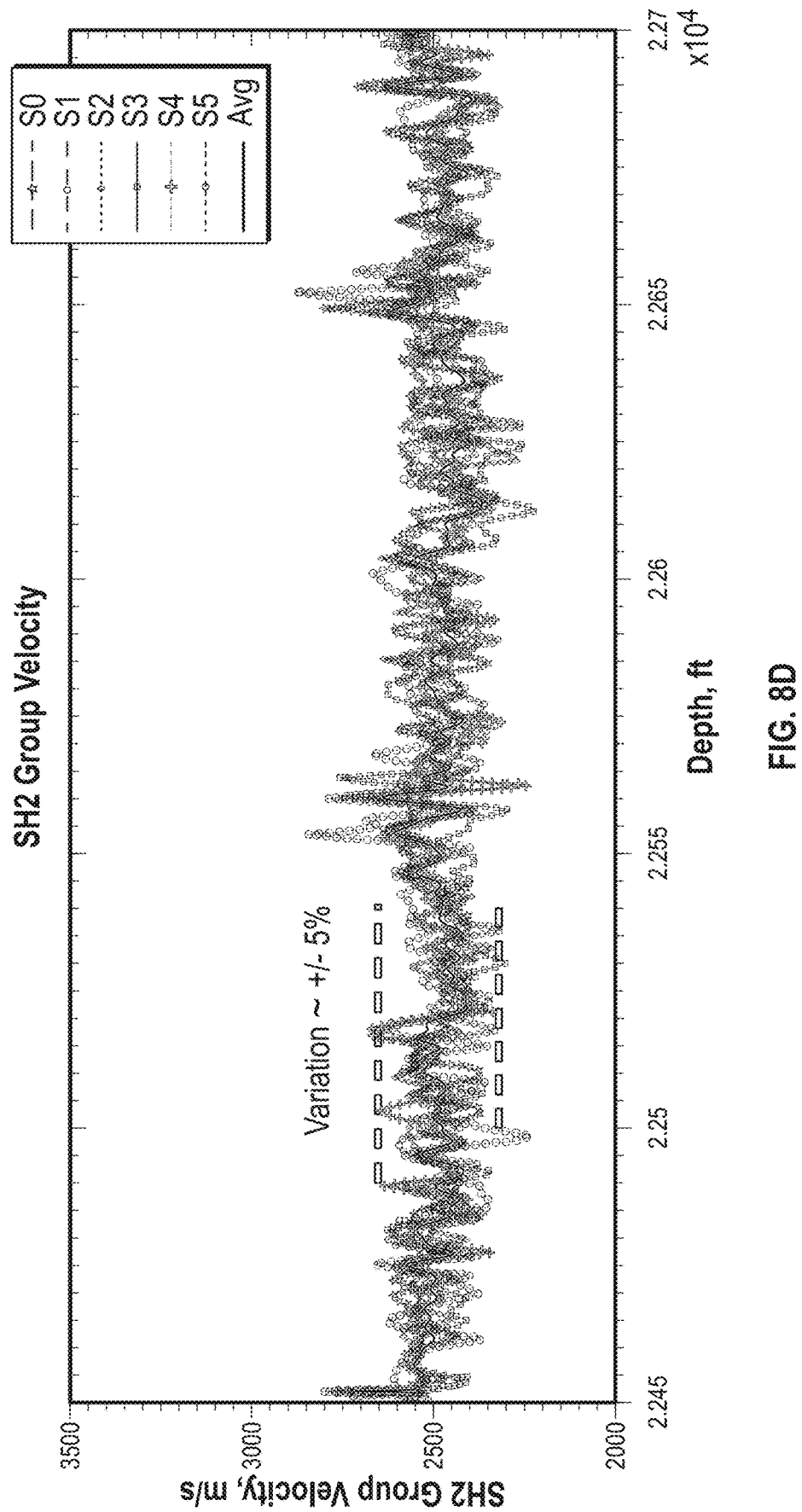
Figure 8E:
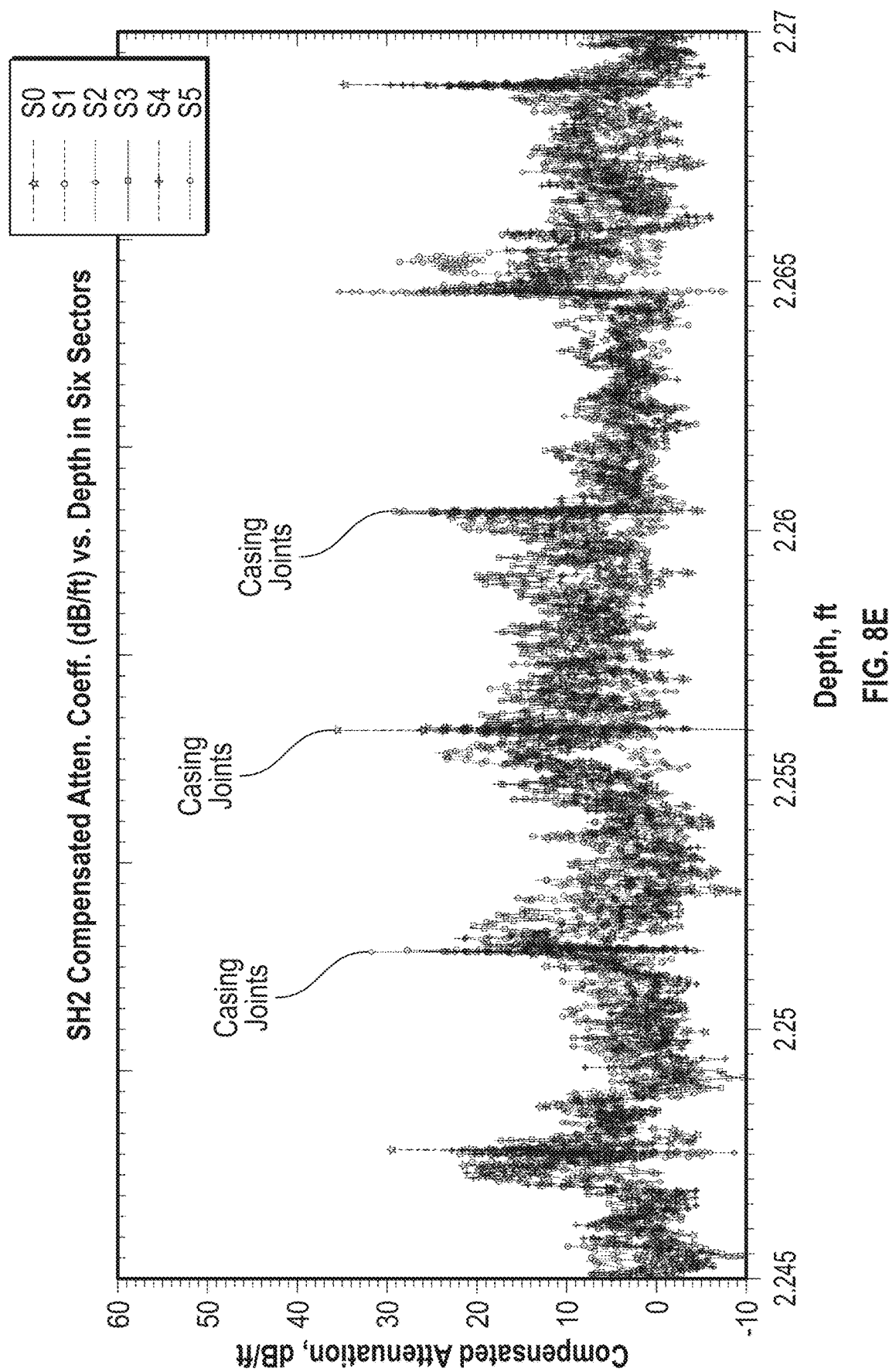

FIGS. 8C-8E show additional test data. FIGS. 8C &8D show the SH2 mode frequency and the SH2 group velocity. The SH2 frequency and the group velocity were more scattered, with a larger variation band in the group velocity (+/–5%, except of the joint areas) and a smaller variation band (+1-2.5%) in the SH2 frequency. FIG. 8E shows compensated attenuation. The SH2 attenuations were higher and exhibited more scattering when compared to the much tighter SH1 attenuations. Note the much larger attenuations around casing joints.

Figure 8F:
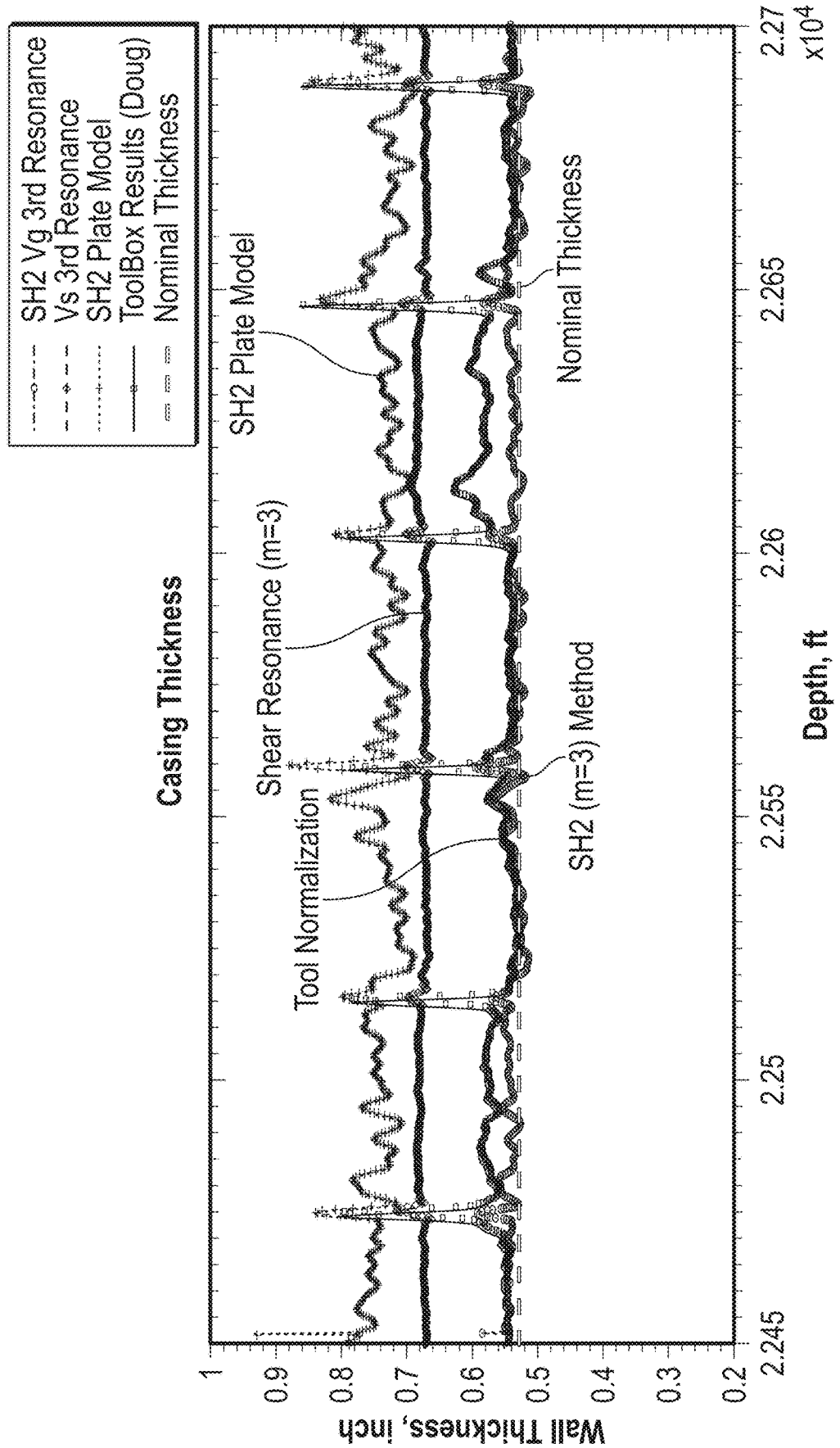
FIG. 8F shows detected thickness in contrast to nominal thickness.
Figure 8G:
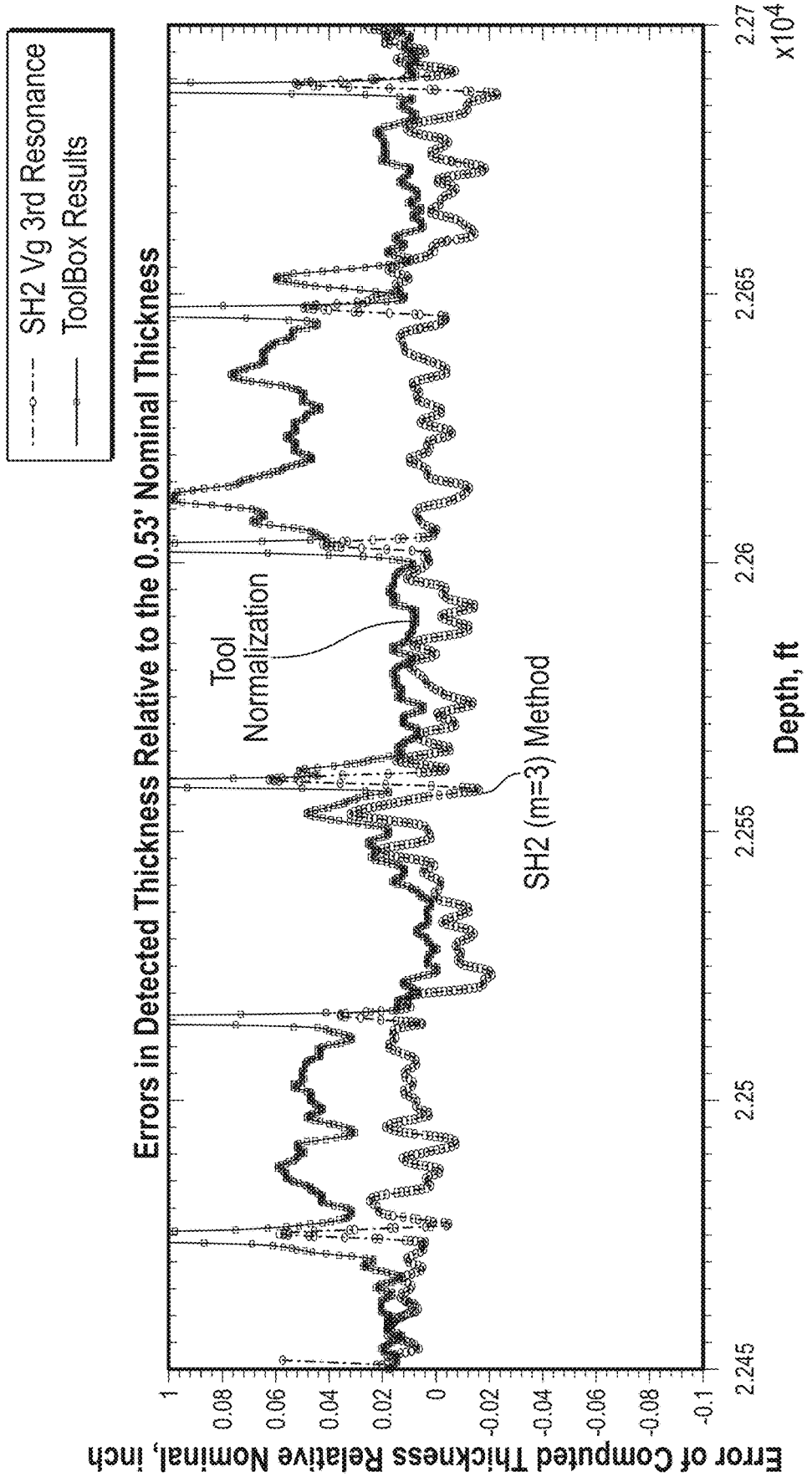
FIG. 8G shows error of detected thickness in contrast to nominal thickness.

FIG. 8F shows detected thickness in contrast to nominal thickness. FIG. 8G shows error of detected thickness in contrast to nominal thickness. The casing thickness (the averaged over the six sectors per depth step) from the SH2-m method in accordance with the present disclosure ($h=mV_g/(2f)$, m=3.0) had the best agreement with the nominal when comparing results from the present techniques, the plate model results, the shear model ($h=mV_s/(2f)$, m=3), and a calibrated method. The averaged error (relative to the nominal) over the depth range was about 0.01 inch.

FIGS. 9A-9G show test well results for the SH1 mode using short-path signals in casing with 7-inch OD, and with 0.318"-0.452" thickness over 400-1000 ft depth sections. Casing was cemented in most depths. The tool used 5 cycles of burst at 268 kHz to excite a dominant SH1 mode at 0.318" and 0.361" thickness.

Figure 9A:
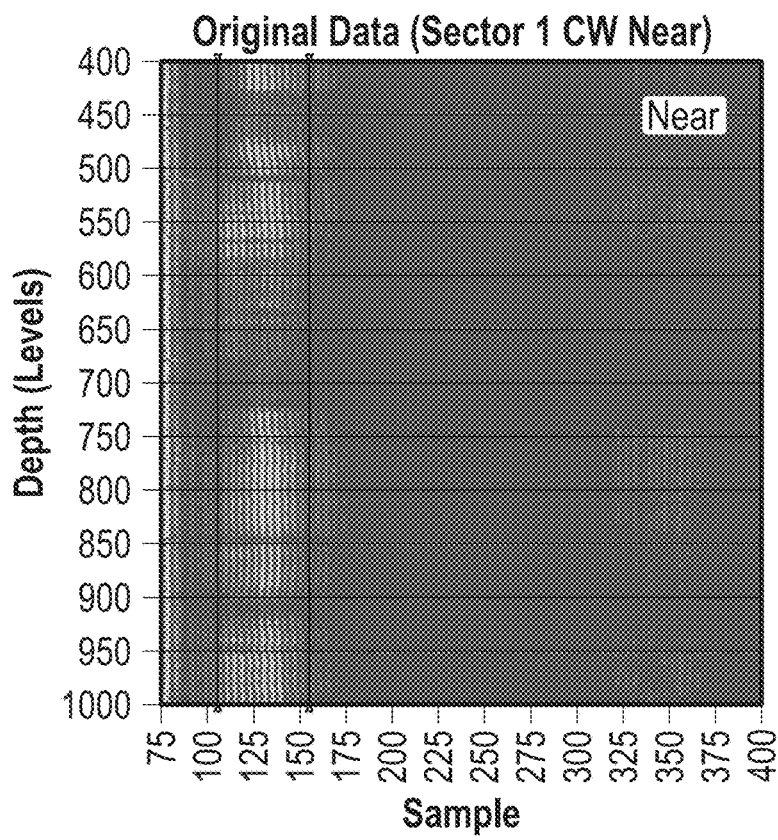
FIGS. 9A-9G show test well results for the SH1 mode using short-path signals in casing with 7-inch OD, and with 0.318"-0.452" thickness over 400-1000 ft depth sections.
Figure 9B:
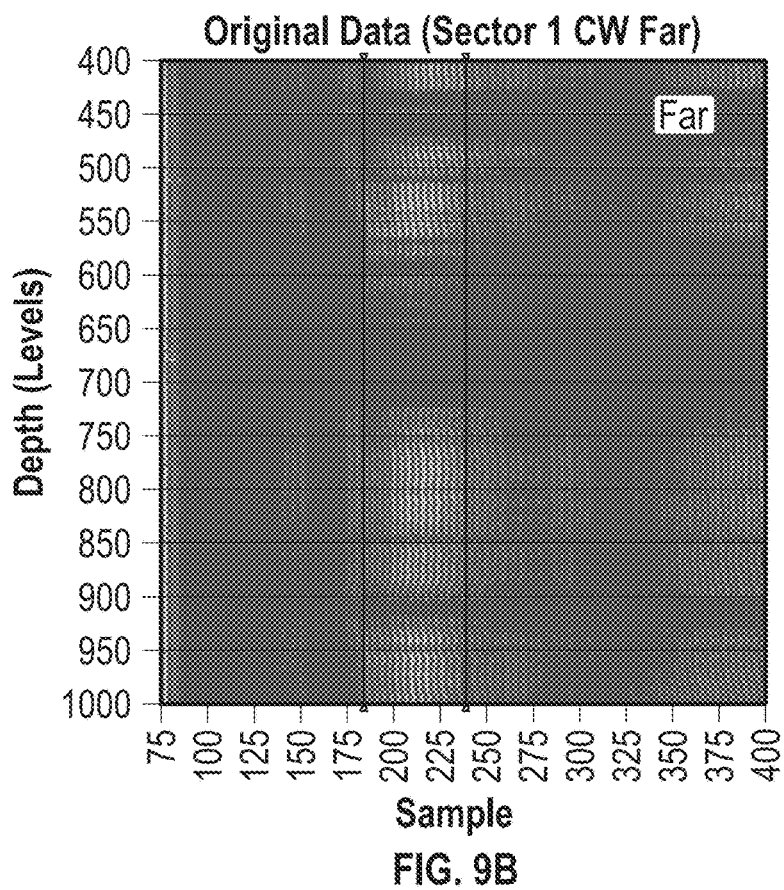

FIGS. 9A-9B show test run examples of the near and far receiver waveforms (from one of the six 60-degree-apart sectors). The short-path SH1 signals around (1/6)L from the near receiver and those around (2/6)L from the far receiver were used in thickness detection. The driver burst is 268 kHz with 5 cycles.

Figure 9C:
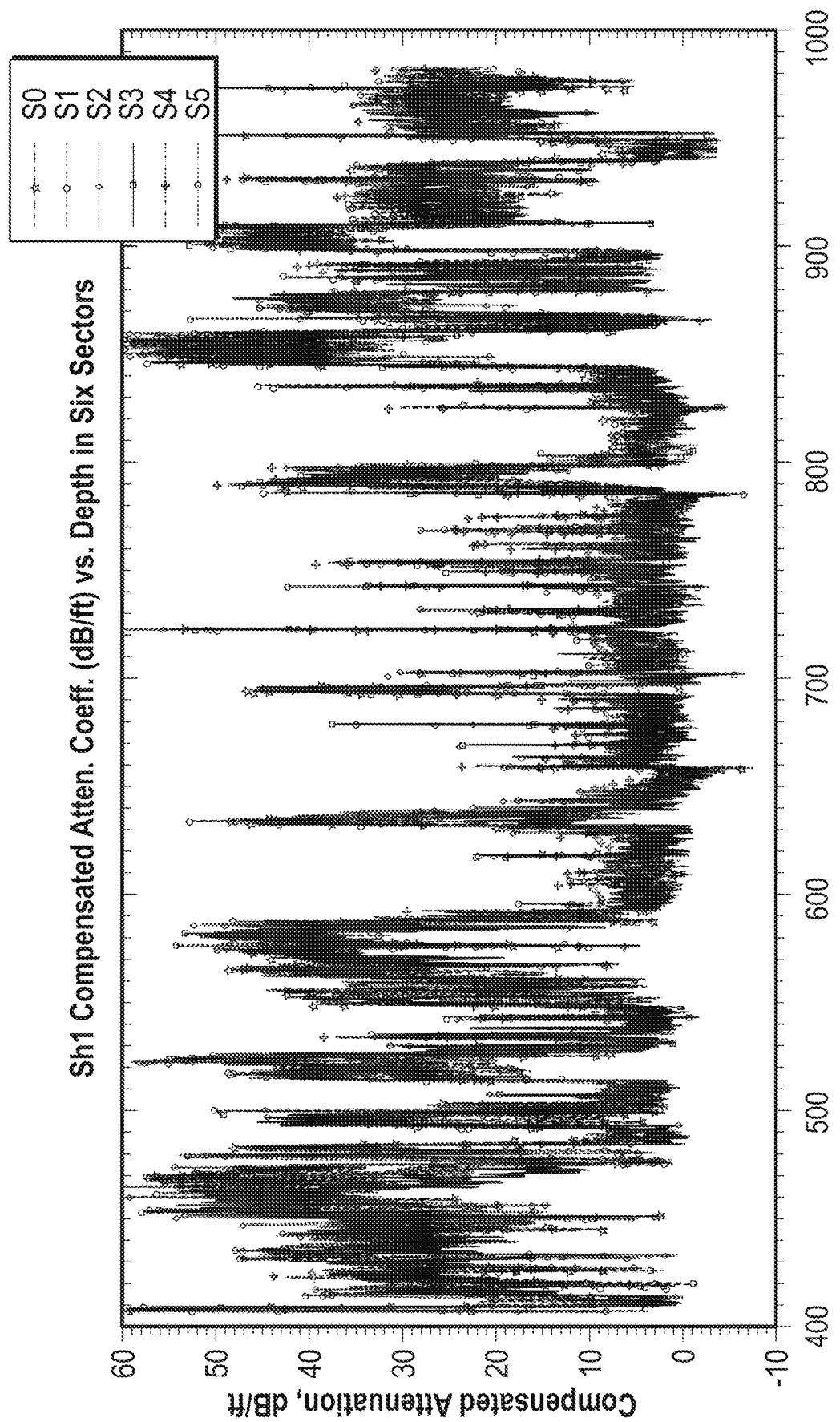
Figure 9D:
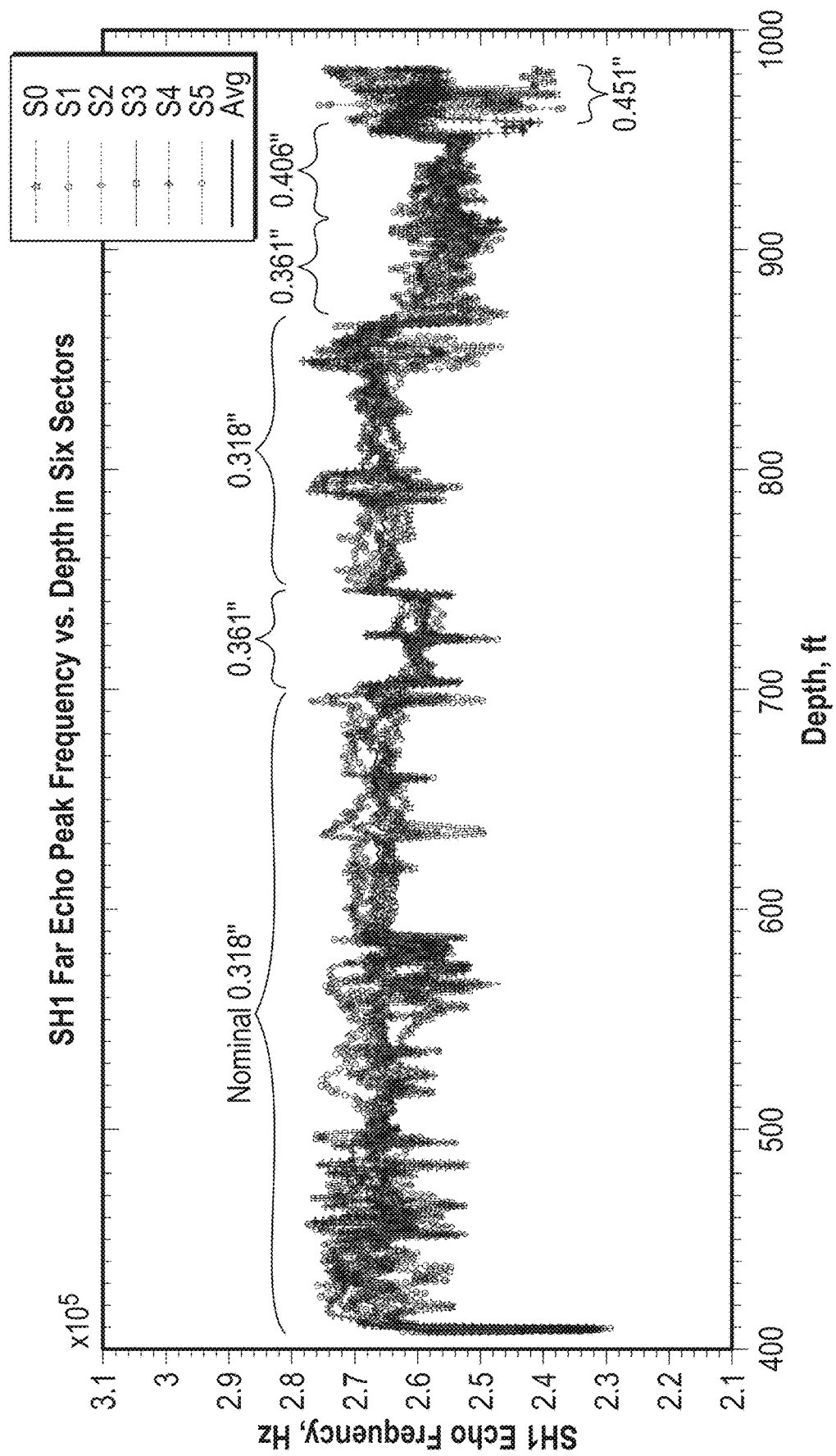
Figure 9E:
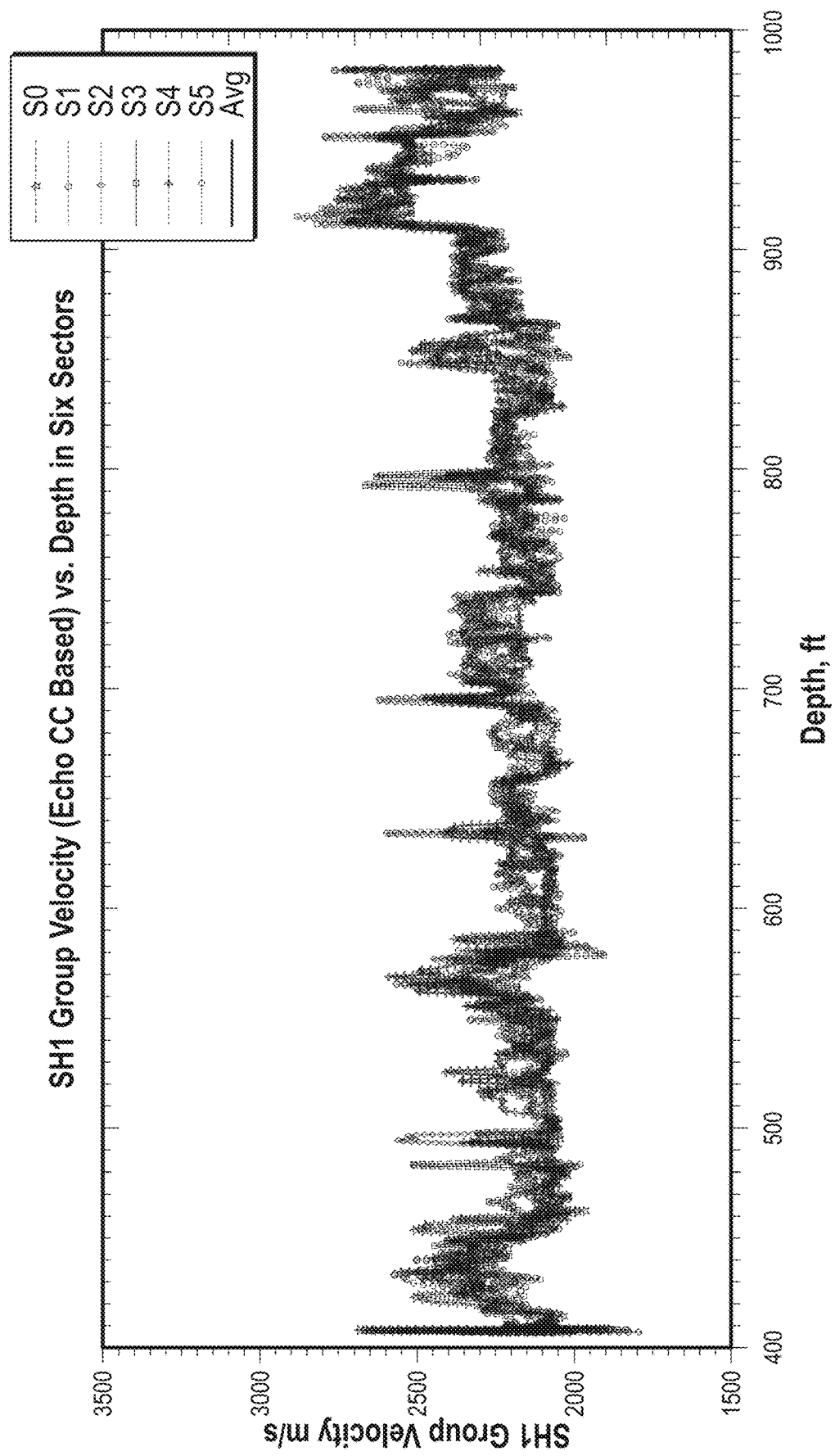
Figure 9F:
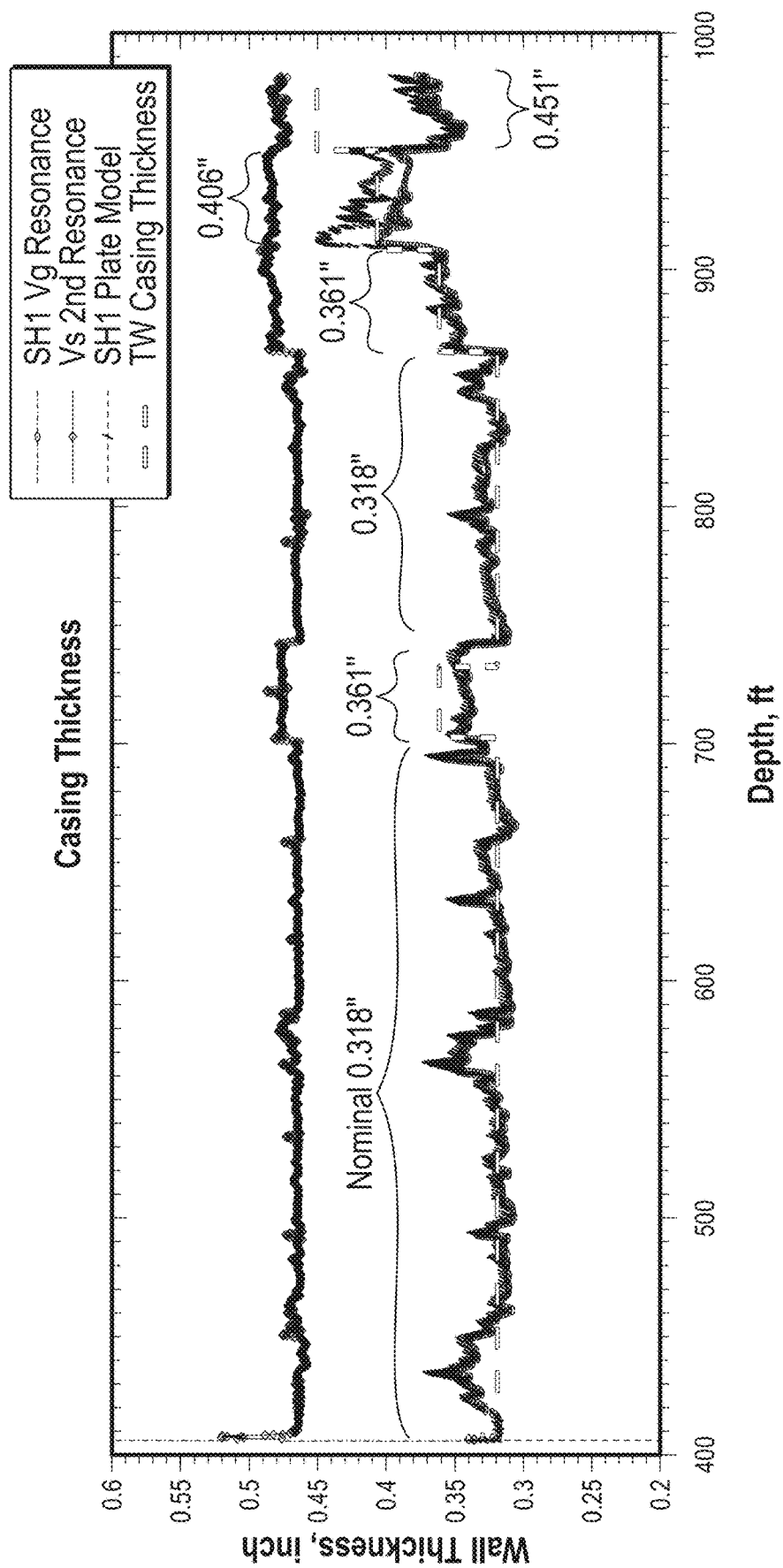
Figure 9G:
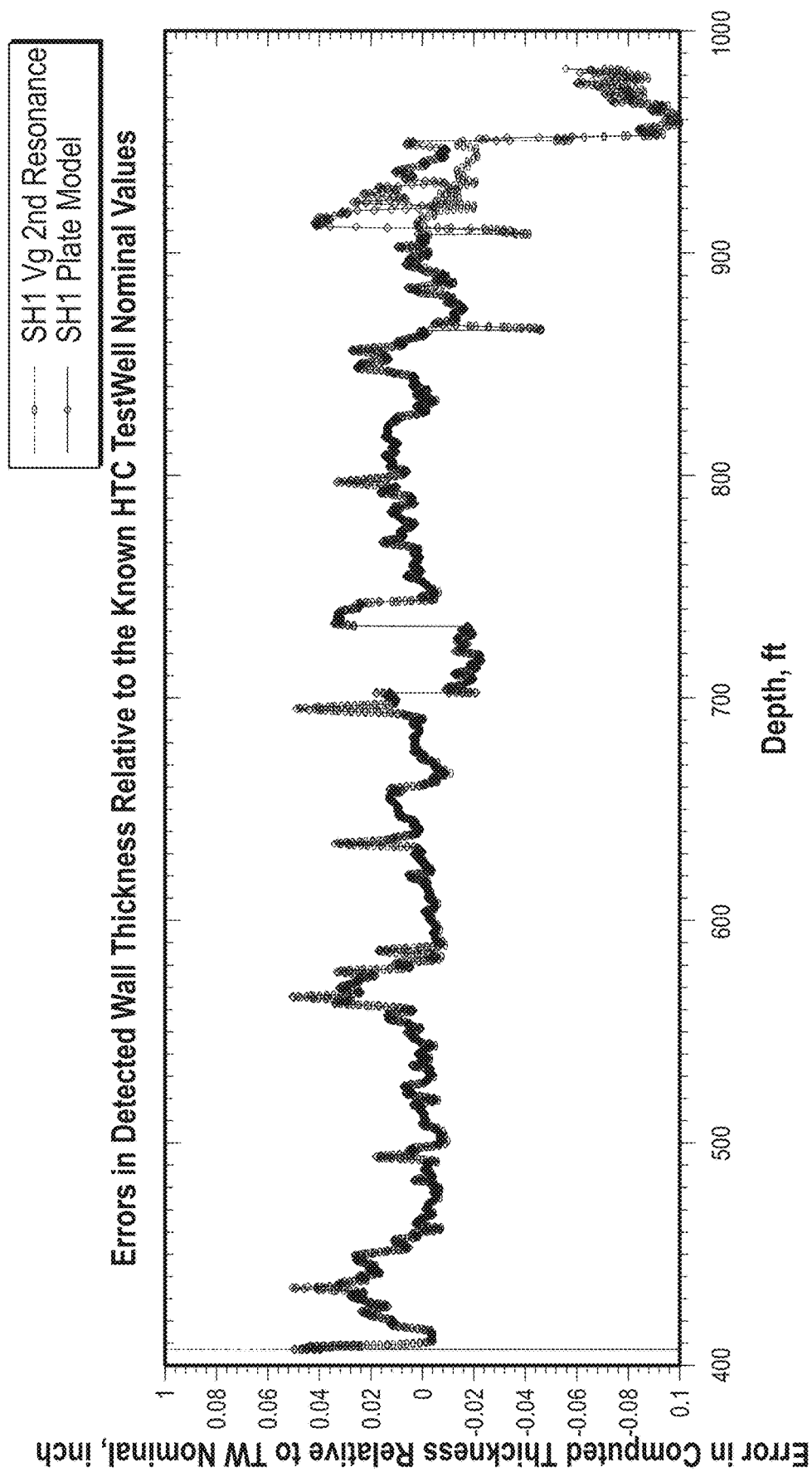

FIG. 9C shows compensated attenuation. The SH1 compensated attenuation results indicated several predominantly cemented zones (high attenuations) and several mostly free pipe zones (low attenuation). The SH1 echoes were weaker in the cemented sections (420-470 ft; 670-720 ft; 900-910 ft). The SH1 frequency and the group velocity (FIGS. 9D &9E) became noisier in the cemented sections where the compensated attenuations were much high (FIG. 9C). Overall, the thickness calculated from the SH1 method (m=2.0) and from the plate model, agreed well to each other and matched quite well to the nominal thickness over the thickness 0.318 to 0.406 in range. (FIGS. 9F and 9G).

Figure 10:
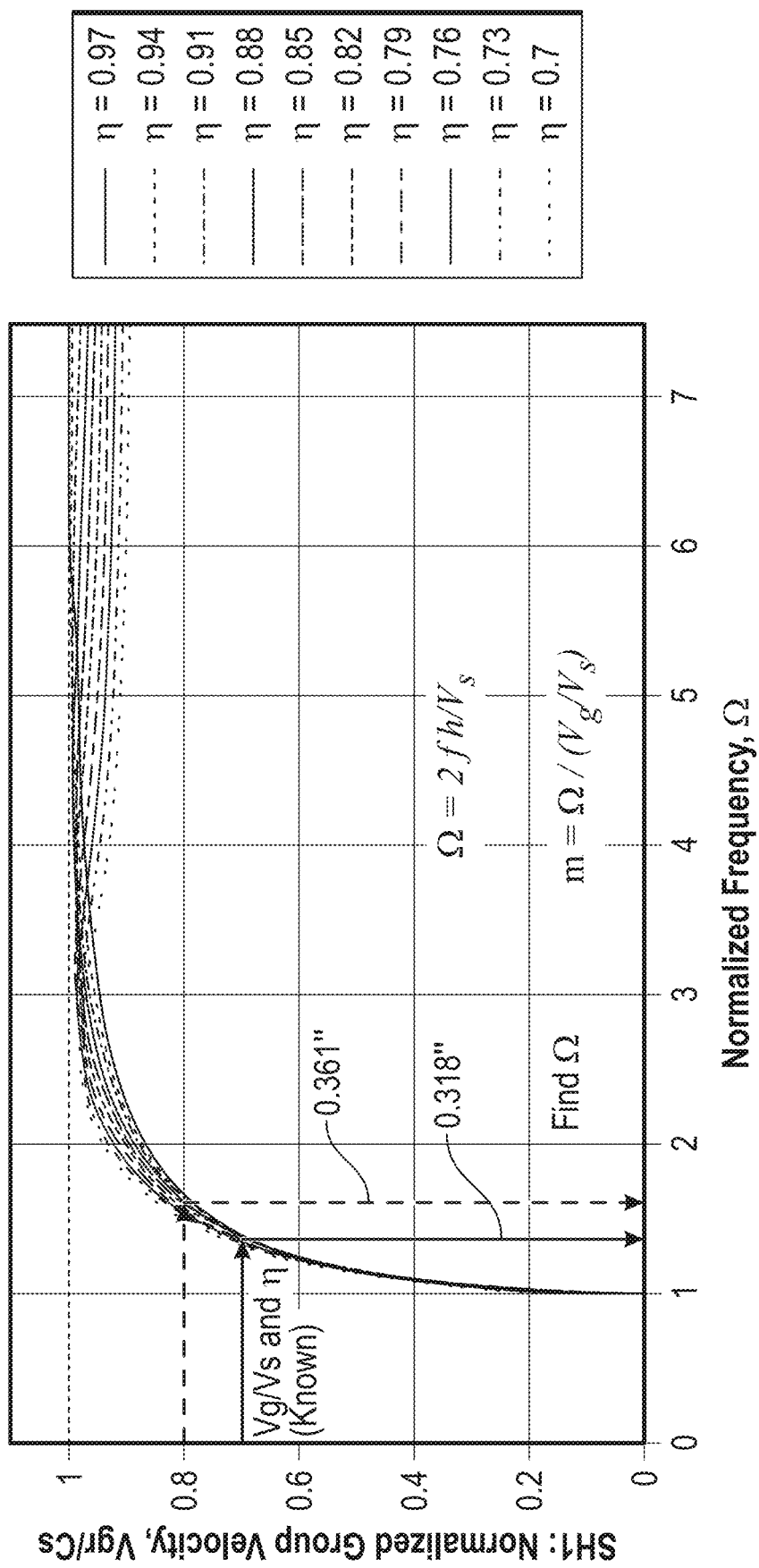
FIG. 10 shows curves of normalized group velocity $V_g/V_s$ with respect to normalized frequency factor, $\Omega$, at various values of shape factor.

FIG. 10 shows curves of normalized group velocity $V_g/V_s$ with respect to normalized frequency factor, $\Omega$, at various values of shape factor. The normalized frequency factor may be expressed as $\Omega=2\ fh/V_s$, where $V_s$ is casing shear velocity, f is SH1 mode frequency, and h is thickness of the casing. Shape factor $\eta$ is a ratio of inner diameter to outer diameter ($\eta=ID/OD$). For a given thickness and group velocity, factor $\Omega$ can be found from each shape factor. The SH1 mode factor, m, can be also determined using normalized group velocity using $m=2\ f\ h/V_g=\Omega(V_g/V_s)$. The test example of FIG. 10 includes three thicknesses (0.316", 0.361, and 0.405"). From each thickness and the averaged group velocity, using the above method, the m-factor was determined as 2.04-2.05.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device.

"Resonant frequency" refers to a frequency having a frequency response maximum. The term "significantly close in frequency" as used herein refers to frequencies having a difference of less than 15 Hz.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "geosteering" may refer to changing direction of the drill bit, stopping progression of the drill bit, or continuing advancement of the drill bit.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Measurements of sonic travel time, or "slowness," are well known, and may be considered as depending upon the properties inherent in Snell's Law to propagate sound from a transmitter to a receiver through an earth formation. Slowness is the inverse of the sound velocity. The measurement is representative of travel time of sound through the formation. Typically the term refers to measurements wherein the transmitter and receiver are in a borehole intersecting the formation, e.g., on a tool string in the borehole. The speed of sound in the earth formation is governed in approximation by the physical properties embodied in the Wood-Biot-Gassmann equations. It is apparent that the values of slowness and velocity may be used interchangeably in the techniques disclosed herein. The parameters slowness and velocity are inversely related and the measurement of either may be converted to the other by simple mathematical relations that are well known in the art. Thus, the term "velocity" as used herein may refer to slowness as traditionally understood, as well as other parametric equivalents.

Substantially the same refers to values within the generally held value for common deviation, such as, for example, due to noise. The term "substantially the same" as applied in the context of signal characteristic refers to frequencies negating the effects of dispersion and attenuation, such that differences in effects between two signals having corresponding signal characteristics are negligible, such as, for example, differences in lateral beam field of less than 25 percent, less than 10 percent, less than 5 percent, less than 3 percent, less than 2 percent, less than 1 percent, less than 0.5 percent, and so on, down to and including no difference.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine-readable medium that enables the processors to perform the control and processing. The non-transitory machine-readable medium may include ROMs, EPROMs, EEPROMs, flash memories and optical disks. The term processor is intended to include devices such as a field programmable gate array (FPGA).

The term "substantially real-time" as applied to methods of the present disclosure refers to an action performed (e.g., estimation, modeling, and so on) while the sensor is still downhole, after the generation of the information and prior to movement of the sensor an appreciable distance within the context of evaluating the borehole or formation at an associated resolution, such as, for example, a distance of 100 meters, 50 meters, 25 meters, 10 meters, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. The term "substantially continuous" as applied to measurement in accordance with embodiments of the present disclosure means that no gaps exist within the measurement corresponding to a circumference of the borehole at a particular borehole depth.

While the foregoing disclosure is directed to the one mode embodiments of the disclosure, various modifications will be apparent to those skilled in the art. It is intended that all variations be embraced by the foregoing disclosure.

What is claimed is:

1. A method of hydrocarbon tubular evaluation, the method comprising:
conveying a logging tool in the tubular with a carrier;
inducing with a transmitter a horizontal shear (SH) wave signal, propagating a first SH wave along a first circumferential path to a first receiver of a plurality of offset receivers, and propagating a second SH wave along a second circumferential path to the first receiver;
identifying a first higher order SH mode signal received at the first receiver, the first higher order SH mode signal responsive to a first higher order SH mode engendered by the first SH wave;
identifying a second higher order SH mode signal received at the first receiver, the second higher order SH mode signal responsive to a second higher order SH mode engendered by the second SH wave;
selecting a single higher order SH mode signal, the selected higher order SH mode signal being one of the first higher order mode signal and the second higher order mode signal;
estimating a dominant frequency based on the selected higher order SH mode signal;
estimating a group velocity based the selected higher order SH mode signal; and
estimating a tubular parameter independent of a fundamental horizontal shear wave mode (SHO), the tubular parameter estimated using a relationship between the dominant frequency, the group velocity, and an empirically derived mode factor associated with the selected higher order SH mode signal.

2. The method of claim 1, further comprising propagating a third SH wave along a third circumferential path to a second receiver of the plurality of offset receivers and identifying a third higher order SH mode signal received at the second receiver, propagating a fourth SH wave to the second receiver along a fourth circumferential path and identifying a fourth higher order SH mode signal received, the third circumferential path being shorter than the fourth circumferential path.

3. The method of claim 1, wherein the tubular parameter comprises at least one of: i) location of the tubular; ii) thickness of a wall of the tubular; and iii) at least one property of a defect of the tubular; iv) a bond of the tubular with cement; v) outer diameter of the tubular; vi) a presence of a joint; and vii) a location of a joint.

4. The method of claim 2, wherein estimating the group velocity comprises estimating a time delay between receiving the first SH wave at the first receiver and receiving the third SH wave at the second receiver, and employing a cross-correlation between a first portion of the first higher order SH mode signal from the first receiver and a second portion of the third higher order SH mode signal from the second receiver.

5. The method of claim 1, wherein the tubular parameter includes a thickness of the tubular.

6. The method of claim 1, wherein selecting the single higher order SH mode signal includes determining a first separation between the first higher order SH mode signal and another SH mode signal, and determining a second separation between the second higher order SH mode signal and the another SH mode signal, selecting the first higher order SH mode signal if the first separation is greater than the second separation, and selecting the second higher order SH mode signal if the second separation is greater than the first separation.

7. The method of claim 2, wherein estimating the group velocity comprises estimating a time delay between receiving the second SH wave at the first receiver and receiving the fourth SH wave at the second receiver and employing a cross-correlation between a first portion of the second higher order SH mode signal from the first receiver and a second portion of the fourth higher order SH mode signal from the second receiver.

8. The method of claim 4, wherein the first receiver is located a first distance from the transmitter along a shortest circumferential path and the second receiver is located a second distance from the transmitter along another shortest circumferential path, wherein the second distance is greater than the first distance, and
wherein estimating the dominant frequency comprises:
performing a Fast Fourier Transform (FFT) of a portion of the selected higher order SH mode signal received at the first receiver, or a portion of the fourth higher order SH mode signal received at the second receiver, to generate a FFT spectrum, and
detecting a peak frequency of the FFT spectrum.

9. The method of claim 1, wherein the tubular comprises production tubing.

10. The method of claim 1, wherein inducing the SH wave signal in the tubular comprises exciting the SH wave signal with an electromagnetic acoustic transducer.

11. The method of claim 1, comprising conducting further operations in the formation depending on the tubular parameter.

12. The method of claim 11, wherein the further operations comprise at least one of i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) installing equipment in the borehole; x) producing one or more hydrocarbons from the formation; xi) repairing the tubular; and xii) replacing the tubular.

13. The method of claim 1, wherein the tubular parameter comprises a characteristic of a structural feature relating to the at least one tubular.

14. The method of claim 13, wherein the structural feature comprises at least one of i) tubular ovality of the at least one tubular; ii) deformation of the at least one tubular; iii) corrosion of the at least one tubular, iv) perforation of the at least one tubular, v) a material property of the at least one tubular; and vi) a material property of a material surrounding the at least one tubular.

15. The method of claim 1, wherein the plurality of offset receivers are azimuthally offset.

16. The method of claim 1, wherein the plurality of offset receivers are axially offset.

17. An apparatus for hydrocarbon tubular evaluation, the apparatus comprising:

a logging tool having disposed thereon a plurality of transducers, the logging tool configured for conveyance in a tubular with a carrier, the plurality of transducers including a transmitter configured to induce a horizontal shear (SH) wave signal, and a plurality of offset receivers including a first receiver and a second receiver, a first SH wave of the induced SH wave signal propagating along a first circumferential path to the first receiver, and a second SH wave from the induced SH wave signal propagating along a second circumferential path to the first receiver; and at least one processor associated with the logging tool configured to:

identify a first higher order SH mode signal received at the first receiver, the first higher order SH mode signal responsive to a first higher order SH mode engendered by the first SH wave;

identify a second higher order SH mode signal received at the first receiver, the second higher order SH mode signal responsive to a second higher order SH mode engendered by the second SH wave;

select a single higher order SH mode signal, the selected higher order SH mode signal being one of the first higher order mode signal and the second higher order mode signal;

estimate a dominant frequency based on the selected higher order SH mode signal;

estimate a group velocity based on the selected higher order SH mode signal; and estimate a tubular parameter independent of a fundamental horizontal shear wave mode (SH0), the tubular parameter estimated using a relationship between the dominant frequency, the group velocity, and an empirically derived mode factor associated with the selected higher order SH mode signal.

18. The method of claim 1, wherein the tubular parameter includes a thickness h of the tubular, and the relationship is represented by:

$$h = m * V_g/(2f),$$

wherein m is the empirically derived mode factor, $V_g$ is the group velocity, and f is the dominant frequency.

19. The apparatus of claim 17, wherein the tubular parameter includes a thickness h of the tubular, and the relationship is represented by:

$$h = m * V_g/(2f),$$

wherein m is the empirically derived mode factor, $V_g$ is the group velocity, and f is the dominant frequency.

* * * * *